United States Patent
Shiozawa

(10) Patent No.: US 8,391,733 B2
(45) Date of Patent: Mar. 5, 2013

(54) IMAGE PROCESSING APPARATUS, RECORDING MEDIUM, AND IMAGE FORMING APPARATUS FOR LOWERING PRINT GLOSSINESS

(75) Inventor: Motohide Shiozawa, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 333 days.

(21) Appl. No.: 12/695,219

(22) Filed: Jan. 28, 2010

(65) Prior Publication Data
US 2010/0196022 A1 Aug. 5, 2010

(30) Foreign Application Priority Data
Jan. 30, 2009 (JP) .................. 2009-020225

(51) Int. Cl.
*G03G 15/00* (2006.01)
(52) U.S. Cl. .......................... 399/45; 399/341
(58) Field of Classification Search ............. 399/38, 399/39, 45, 320, 341; 358/1.9, 2.1
See application file for complete search history.

(56) References Cited

U.S. PATENT DOCUMENTS

| 5,260,753 | A | 11/1993 | Haneda et al. | 355/282 |
| 7,321,449 | B2* | 1/2008 | Ide et al. | 358/1.9 |
| 7,697,177 | B2* | 4/2010 | Nishikawa | 358/523 |
| 7,783,242 | B2* | 8/2010 | Chigono et al. | 399/341 |

FOREIGN PATENT DOCUMENTS
JP 04-338984 11/1992
* cited by examiner

*Primary Examiner* — Hoan Tran
(74) *Attorney, Agent, or Firm* — Fitzpatrick, Cella, Harper & Scinto

(57) ABSTRACT

In the case where a sheet on which a transparent toner image is to be formed has low glossiness, when the transparent toner image is formed in an area in which a user wishes to partly lower the glossiness, the glossiness in the area in which the user wishes to lower the glossiness is increased. For that reason, a print as desired by the user cannot be obtained by fixing the transparent toner image in an area corresponding to the area in which the user wishes to lower the glossiness. In the case where the sheet to be subjected to printing is judged as low glossy paper, the transparent toner image is placed in an image formable area except for the area in which the user wishes to lower the glossiness.

6 Claims, 14 Drawing Sheets

(a)

100MFP (b)

100MFP     200MFP Controller     300PC (c)

100MFP     300PC

IMAGE PROCESSING APPARATUS, RECORDING MEDIUM, AND IMAGE FORMING APPARATUS FOR LOWERING PRINT GLOSSINESS

FIELD OF THE INVENTION AND RELATED ART

The present invention relates to an image processing apparatus for generating image data for transparent toner to be used when an image forming portion forms a transparent image, a program for causing an information processing apparatus or an processing system to function as the processing apparatus image, a recording medium storing the program, and an image forming apparatus.

In a recent printing market, improvement in quality of a print by increasing glossiness in a designated area has been required. That is, there is a demand to make the glossiness in the designated area higher than the glossiness in another area.

For example, in an image forming apparatus described in Japanese Laid-Open Patent Application (JP-A) Hei 4-338984, the demand is met by using the transparent toner. Specifically, an image of the transparent toner is selectively formed in the designated area to partly increase the glossiness of the print. As a result, by using the image forming apparatus described in JP-A Hei 4-338984, it was possible to make the glossiness in the designated area higher than the glossiness in another area.

With diversification of a representation method of the print, there was also a demand to realize the print of high quality by lowering the glossiness in the designated area. As a result of a study made by the present inventor in order to meet the demand, it was found that the glossiness in the transparent toner image was formed was lowered by forming the transparent toner image in the designated area, similarly as in the case of JP-A Hei 4-338984, when the glossiness of the sheet on which the transparent toner image was to be formed was high.

However, in the case where the glossiness of the sheet on which the transparent toner image was to be formed was low, the glossiness in the area in which the transparent toner image was formed was unable to be lowered by forming the transparent toner image in the designated area.

SUMMARY OF THE INVENTION

A principal object of the present invention is to provide an image processing apparatus capable of making glossiness in a designated area lower than glossiness in another area even in the case where the glossiness of a sheet on which a transparent toner image is to be formed is low.

Another object of the present invention is to provide a program for causing an information processing apparatus or system to function as the image processing apparatus, a recording medium storing the program, and an image forming apparatus including the image processing apparatus.

According to an aspect of the present invention, there is provided an image processing apparatus for generating image data to be sent to an image forming portion for forming a transparent image so that transparent toner is placed on at least a part of a sheet on which an image is to be formed, the image processing apparatus comprising:

sheet information obtaining means for obtaining information corresponding to glossiness at a surface of the sheet on which the image is to be formed;

area information obtaining means for obtaining information indicating an area in which the glossiness is to be lowered partly and relatively with respect to the sheet on which the image is to be formed; and image data generating means for generating, when the glossiness at the surface of the sheet is less than predetermined glossiness on the basis of the information obtained by the sheet information obtaining means, the image data to be sent to the image forming portion so that the transparent image is selectively formed in an image formable area except for the area obtained by the area information obtaining means.

According to another aspect of the present invention, there is provided an image processing apparatus for generating image data to be sent to an image forming portion for forming a transparent image so that transparent toner is placed on at least a part of a sheet on which a color image is to be formed, the image processing apparatus comprising:

sheet information obtaining means for obtaining information corresponding to glossiness at a type of the sheet on which the color image is to be formed;

area information obtaining means for obtaining information indicating an area in which the glossiness of the color image to be formed on the sheet is to be lowered partly and relatively; and image data generating means for generating the image data to be sent to the image forming portion depending on the information obtained by the sheet information obtaining means so that the glossiness in the area obtained by the area information obtaining means is lowered relatively.

According to a further aspect of the present invention, there is provided a program for causing an information processing apparatus to function as the above-described image processing apparatuses.

According to a further aspect of the present invention, there is provided a program for causing an information processing system including a plurality of information processing apparatuses to function as the above-described image processing apparatuses.

According to a further aspect of the present invention, there is provided a recording medium storing the above program.

According to a further aspect of the present invention, there is provided an image forming apparatus for forming a transparent image so that transparent toner is placed on at least a part of a sheet on which an image is to be formed, the image forming apparatus comprising:

sheet information obtaining means for obtaining information corresponding to glossiness at a surface of the sheet on which the image is to be formed;

area information obtaining means for obtaining information indicating an area in which the glossiness is to be lowered partly and relatively with respect to the sheet on which the image is to be formed; and transparent image forming means for selectively forming, when the glossiness at the surface of the sheet is less than predetermined glossiness on the basis of the information obtained by the sheet information obtaining means, a transparent toner image in an image formable area except for the area obtained by the area information obtaining means.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

Figure 1:
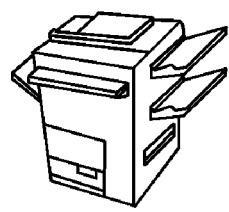
FIGS. 1(a), 1(b) and 1(c) are schematic views each showing an example of a constitution of an image forming system in an embodiment of the present invention.
Figure 1:
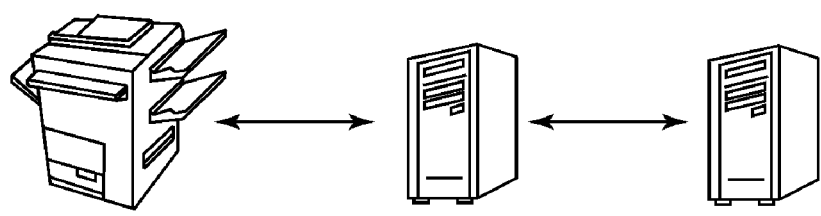
Figure 1:
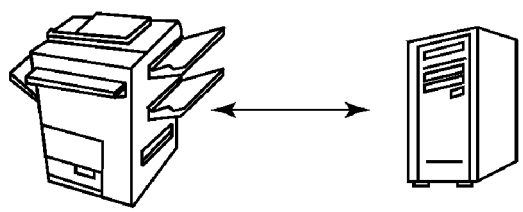

In the following embodiments, a glossiness representing a degree of gloss was measured by using a handy glossimeter ("PG-1M", mfd. by Nippon Denshoku Industries Co., Ltd.). The measurement was performed in a 60 degree-glossiness measurement mode in accordance with JIS Z 8741 (specular glossiness measuring method).

Embodiment 1

Embodiment 1 will be described below. First, a system constitution will be described. Then, respective constituent elements constituting the system will be described. Thereafter, an operation of the system will be described along a flow chart. Hereinafter, an image processing system refers to an information processing system for generating image data used for printing at a printer portion 115 (FIG. 3) as an image forming portion. Further, an image forming system refers to the image processing system including the printer portion 115.

(Image Forming System Constitution)

FIGS. 1(a), 1(b) and 1(c) are schematic views each showing an example of a constitution of the image forming system. The image forming system consists of the following three apparatuses. A first is an MFP 100 as an image forming apparatus. A second is an MFP controller 200 as an external controller. A third is a PC 300 as the information processing apparatus. The image forming system is constituted by the above three apparatuses. The PC, the MFP and the MFP controller are connected with each other directly or through a network in a communicable manner.

First, in the constitution shown in FIG. 1(a), image processing and image formation are effected by the MFP 100 alone. In such a constitution, the user operates an operating panel 112 (FIG. 3) of a main assembly of the MFP 100, so that the user can transmit a print instruction to the MFP 100. In the constitution, the image processing is executed by a CPU 101 (FIG. 2) and a dedicated image processing circuit 206 (FIG. 2) which are provided inside the MFP 100 main assembly. In this embodiment, the image processing executed in the constitution will be described.

Next, in the constitution shown in FIG. 1(b), the PC 300 is connected to the MFP 100 through the MFP controller 200 in a communicable manner. In such a constitution, the user can send the print instruction to the MFP controller 200 by operating the PC 300. In the constitution, the image processing is effected by a CPU 201 (FIG. 13) and a dedicated image processing circuit 206 (FIG. 13) which are provided inside the MFP controller 200. In Embodiment 2 described later, the image processing executed in the constitution will be described.

Finally, in the constitution shown in FIG. 1(c), the PC 300 is connected to the MFP 100 in a communicable manner. In such a constitution, the user can send the print instruction to the MFP 100 by operating the PC 300. In the constitution, the image processing is effected by a CPU 301 (FIG. 14) provided inside the PC 300. In Embodiment 3 described later, the image processing executed in the constitution will be described.

The respective apparatuses constituting the above-described image forming system effect communication with each other in accordance with Ethernet standard standardized by IEEE 803.2 standard. The above-described examples of the image forming system are merely illustrative and therefore the image forming system in the present invention is not limited thereto.

The MFP controller 200 and the PC 300 will be described later in Embodiment 2 and Embodiment 3, respectively in detail.

(Hardware Configuration of MFP)

A hardware configuration of an MFP as an example of the image forming apparatus will be described. The MFP 100 is constituted by a controller portion, a scanner portion, and the printer portion. The respective portions will be described below in detail.

(Controller Portion)

Figure 2:
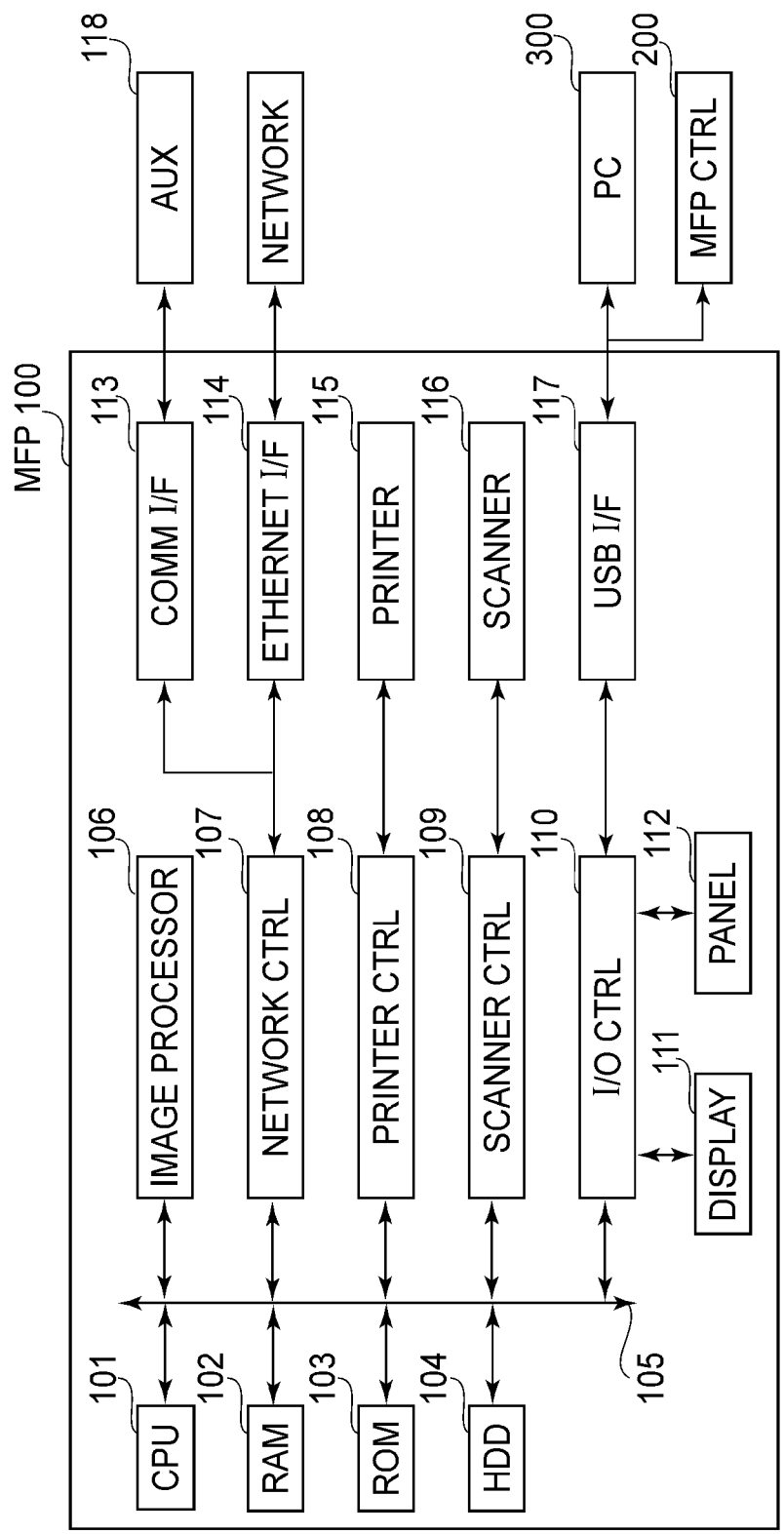
FIG. 2 is a block diagram showing a schematic constitution of an MFP (multifunction peripheral) in the embodiment of the present invention.

FIG. 2 is a block diagram showing an example of the hardware configuration of the MFP 100. A CPU 101, an RAM (random access memory) 102, and an ROM (read only memory) 103 are connected to a bus 105. Similarly, a HDD (hard disk drive) 104, a dedicated image processing circuit 106, a network controller 107, a printer controller 108, a scanner controller 109, and an I/O controller 110 are connected to the bus 105. The various units connected to the bus 105 can communicate with each other through the bus 105.

In such a constitution, the CPU 101 as the control means sends control instructions or the like, through the bus 105, to the HDD 104, the network controller 107, the printer controller 108, the scanner controller 109, and the I/O controller 110. Further, the CPU 101 receives, through the bus 105, a state indicating signal or data such as image data from the HDD 104, the network controller 107, the printer controller 108, the scanner controller 109, and the I/O controller 110. Thus, the CPU 101 can control the various units constituting the MFP 100. Operations of the respective units will be described more specifically.

The CPU 101 and the dedicated image processing circuit 106 expand a program stored in, e.g., the ROM 103 into a primary memory which is called registry present in the CPU 101 or the dedicated image processing circuit 106 and execute the program. The RAM 102 is shared and used as a secondary memory needed during execution of the program by the CPU 101 or the dedicated image processing circuit 106. The HDD 104 having a larger storage capacity than that of the ROM 103 is principally used for storing the image data held in the MFP 100. The network controller 107 is a processing circuit for communicating with external equipment. The network controller 107 modulates and converts signals sent from the CPU 101 into signals in accordance with various standards. In this embodiment, the network controller 107 converts the sent signals into multi-valued signals in accordance with IEEE 803.2 standard and sends the signals to a network through an ethernet I/F 114. Further, the network controller 107 demodulates the multi-valued signals sent from the network through the ethernet I/F 114 and sends the signals to the CPU 101. As a result, the MFP 100 may communicate with the MFP controller 200 or the PC 300 through the network. Similarly, the network controller 107 converts a signal sent from the CPU 101 into a signal in accordance with ARCNET (attached resource computer network) standard and sends the signal to an auxiliary device 118 through an auxiliary I/F 114. Further, the network controller 107 demodulates a signal received from the auxiliary device 118 and sends the signal to the CPU 101. As the auxiliary device 118, e.g., a finisher as a post-processing device, a paper deck as an auxiliary sheet feeding device, and the like may be used. Picture data sent from the CPU 101 to a printer portion 115 as an image forming portion through the printer controller 108 is image data. Therefore, when a PDL (page description language) is inputted from the PC 300 to the MFP 100, the CPU 101 and the dedicated image processing circuit execute RIP (raster image processing) in a shared manner. Incidentally, the PDL is a programming language for instructing a picture image to be outputted to the MFP 100. Advantages of the PDL is that graphics can be held as vector data independent of a resolution of the printer and that an amount of data in the case of a simple line image can be made smaller than that of the image data. On the other hand, by using the PDL, the PDL is required to be re-converted into map image data needed during output at the printer portion, so that processing therefore incurs overhead. Such a processing for converting the PDL into the image data is referred to as the RIP. In this way, the image data converted from the PDL by the RIP is sent to the printer portion 115 through the printer controller 108. The printer portion 115 outputs a print on the basis of the received image data. Incidentally, the printer controller 108 controls the printer portion 115 on the basis of the externally inputted image data so that a toner image corresponding to the image data can be fixed on the sheet. The printer controller 108 can control the printer portion 115 on the basis of the image data sent from the MFP controller 200 in Embodiment 2 and sent from the PC 300 in Embodiment 3.

The scanner controller 109 controls an original image reading operation of an image sensor provided at a lower portion of an original carriage provided to a scanner portion 116 and an operation of an ADF (automatic document feeder). A user sets an original on the original carriage one by one when the image data of the original is read by the MFP 100. The scanner controller 109 receives original reading instructions and actuates the image sensor provided at the lower portion of the original carriage to scan the original surface, thus obtaining image data of the original set on the original carriage. Further, the user can provide instructions to set a plurality of sheets of the original and to read image data from the plurality of sheets. As a result, the ADF feeds one of the plurality of sheets of the original to the image sensor portion. Then, the ADF feeds one of the plurality of sheets, excluding the sheet which has already been fed to the image sensor portion, to the image sensor portion, thus repeating this operation until the feeding of the plurality of sheets of the original is completed. As a result, it is possible to automatically and successively read the image data from the original set to the ADF. Thus, in the case subjecting a large amount of the original to scanning, it is possible to save the user from placing another one of the plurality of sheets of the original on the original carriage one by one.

In a case where a box mode for storing an image in the HDD 104 provided in the MFP 100 is selected, the scanner controller 109 stores the image data obtained by the scanner portion 116 in the HDD 104. In the case where a copy mode for outputting the image data, obtained by the scanner portion 116, from the printer portion 115, is selected, the scanner controller 109 sends the image data obtained by the scanner portion 116 to the printer controller 108. As a result, the printer controller 108 outputs the received image data to the printer portion 115.

The I/O controller 110 communicate with the PC 300 or the MFP controller 200 through a USB (universal serial bus) I/F 117. Further, the I/O controller 110 is connected to a display 111 as a displaying means and an operation panel as an input means. The CPU 101 can obtain information inputted from the operation panel by the user through the I/O controller 110. Further, the I/O controller 110 displays information selectable by the user or information indicating a state of the MFP 100 on the display 111. On the display 111, a screen into which information on glossiness of the sheet to be used in the MFP 100 is to be input, a screen into which information on an area in which the glossiness is intended to be partly and relatively lowered by using transparent toner is to be input, and the like screen are displayed.

The above is the description for the controller portion.

(Scanner Portion)

The scanner portion in this embodiment will be described below. The scanner portion 116 is disposed above the printer portion 115 in FIG. 3. As described above, the scanner portion 116 is constituted by the image sensor as the photoelectric conversion element for reading the original image, the original carriage, and the ADF. The scanner portion 116 obtains the image data of the original set on the original carriage or the ADF. The image data obtained by the scanner portion 116 is sent to the scanner controller 109. The scanner controller 109 can send the image data obtained by the scanner portion 116 to the respective portions connected thereto through the bus 105.

(Printer Portion)

Figure 3:
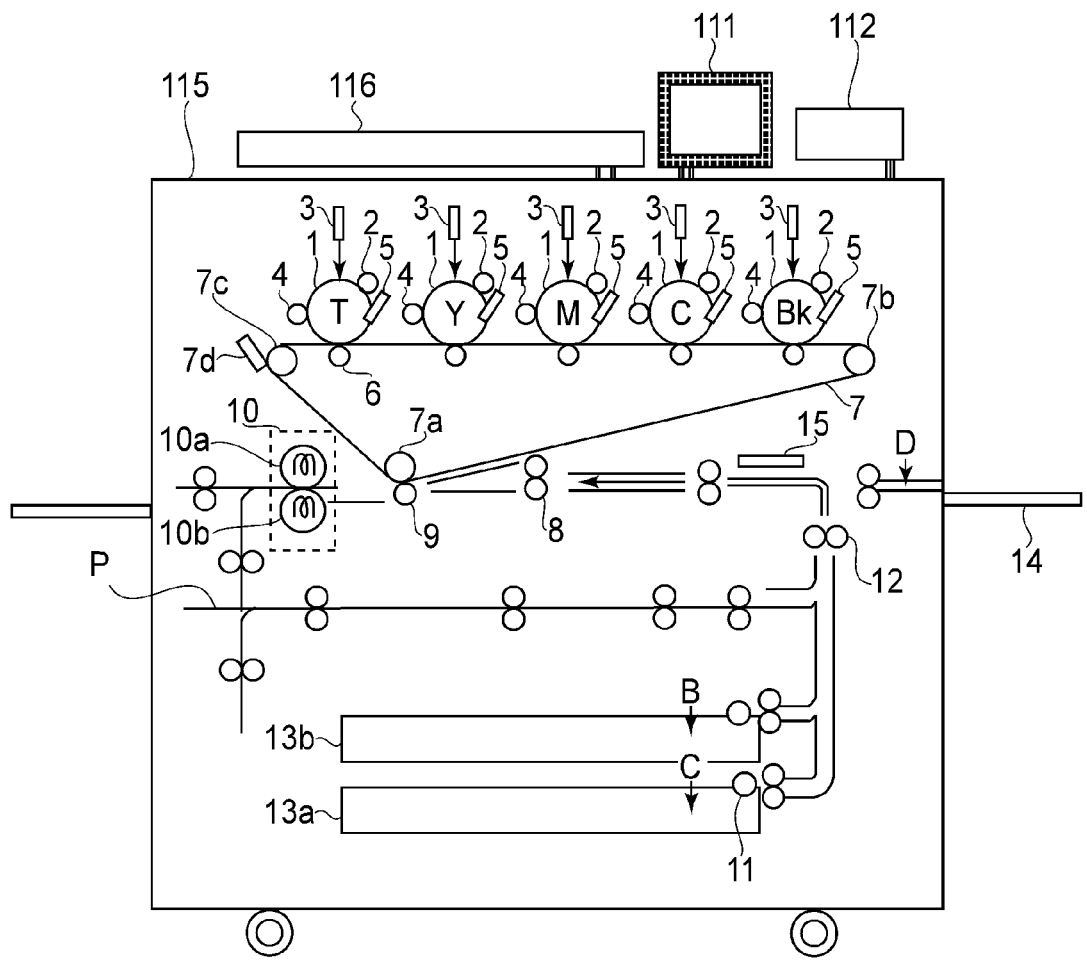
FIG. 3 is a schematic view showing the MFP in the embodiment of the present invention.

The printer portion 115 in this embodiment will be described. FIG. 3 is a schematic view for illustrating a structure of the MFP 100. In this embodiment, the printer portion is of an electrophotographic type. For that reason, the printer portion 115 includes a conveyance portion, an image forming portion, and a fixing portion. The conveyance portion, the image forming portion, and the fixing portion will be described below.

(Conveyance Portion)

The conveyance portion is constituted by cassettes 13a and 13b, a manual feeding tray 14, a pick-up roller 11, a conveyance roller pair 12, and a registration roller pair 8. The sheet as a recording material is set in the cassettes 13a and 13b. Each of the glossiness, a basis weight, the type, and the like of the sheet set in the cassettes 13a and 13b can be manually designated by operating the operation panel 102 by the user. In this embodiment, an example in which a glossiness sensor 15 (FIG. 4) is not provided will be described, but the glossiness sensor 15 is utilized in Embodiment 2, thus being explained in a subsequent item. A flow of conveyance of the sheet set in the cassette 13a will be described.

The sheet set in the cassette 13a is fed by the pick-up roller 11 one by one. The sheet fed by the pick-up roller 11 is conveyed by the conveyance roller pair 12. The sheet conveyed by the conveyance roller pair 12 runs into the registration roller pair 8 which is at rest. The sheet which has run into the registration roller pair 8 is conveyed to a secondary transfer portion by the registration roller pair 8 rotated so as to be synchronized with the toner image on the intermediary transfer belt 7.

(Sheet Glossiness Sensor)

Figure 4:
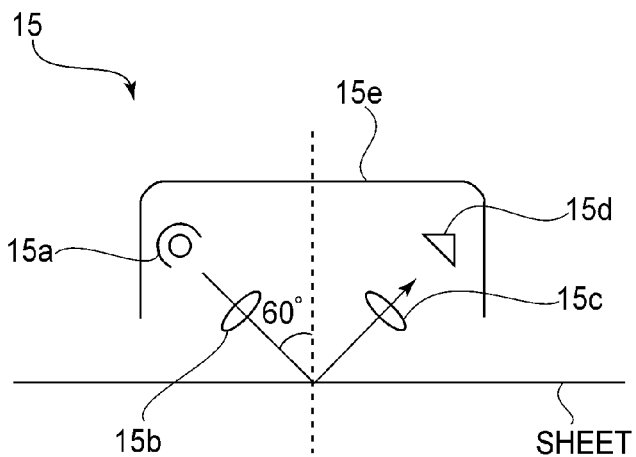
FIG. 4 is a schematic view for illustrating a glossiness sensor in the embodiment of the present invention.

FIG. 4 is a schematic view showing a constitution of a sensor for detecting the glossiness of the sheet. The glossiness sensor 15 is provided at a position shown in FIG. 4 and is constituted by a light-emitting source 15a, condenser lenses 15b and 15c, a light-receiving sensor 15d, and a light-blocking hold 15e. Here, the glossiness sensor 15 employs a measuring method in accordance with "60 degree-specular glossiness measuring method" defined in JIS Z 8741 but the glossiness may also be measured by another measuring method. The glossiness sensor 15 used in Embodiment 2 and Embodiment 3 can measure the glossiness of the surface of the sheet which has run against a registration roller pair 8.

The "60 degree-specular glossiness measuring method is such a method that a beam (flux) of light is caused to be incident on the sheet surface and the beam of light reflected by the sheet surface is measured by the light-receiving sensor 15d. Specifically, the light emitted from the light-emitting source 15a passes through the condenser lens 15b and is incident on the sheet as the beam (flux) of light. The light incident on the sheet is reflected by the sheet surface. The beam of light reflected in a specular reflection direction is condensed by the condenser lens 15c and then is detected by the light-receiving sensor 15d. Incidentally, by the light-blocking hood 15e, the light-receiving sensor 15d can reduce a measurement error caused by disturbance light.

The schematic constitution of the glossiness sensor 15 is described above. In the case where the MFP 100 includes the glossiness sensor 15, the glossiness sensor 15 is controlled, as a part of the printer portion 115, by the printer controller 108. The glossiness sensor 15 used in Embodiment 2 and Embodiment 3 sends the glossiness (data) to the printer controller 108. The printer controller 108 notifies the glossiness measured by the glossiness sensor 15 of the MFP 100 when the glossiness (data) is required by the CPU 101. As a result, the MFP 100 can notify the glossiness (data) obtained by the glossiness sensor 15 of the PC 300 or the MFP controller 200. In the constitution in Embodiment 3, the glossiness sensor 15 is provided in plurality at positions B, C and D shown in FIG. 3.

(Image Forming Portion)

The image forming portion is constituted by image forming stations for respective colors and an intermediary transfer belt unit. An image forming station T as a transparent image forming means for forming the transparent image is constituted by a photosensitive drum 1, a charger 2, a laser scanner 3, a developing device 4, a primary transfer roller 6, and a drum cleaner 5. Also with respect to other colors, the image forming stations have the substantially same constitution except for the toner contained in the developing device. The intermediary transfer belt unit is constituted by the intermediary transfer belt 7, a follower roller 7a, a secondary transfer opposite roller 7b, and a driving roller 7c.

The constitution of the image forming portion will be described along a flow of formation of the toner image, for being transferred onto the sheet, on the intermediary transfer belt 7. The transparent toner image is formed by the image forming station T. Similarly, a yellow toner image, a magenta toner image, a cyan toner image, and a black toner image are formed by image forming stations Y, M, C and Bk, respectively. The respective image forming stations T, Y, M, C and Bk are substantially horizontally provided. The toner images formed by the respective image forming stations T to Bk are respectively primary-transferred onto the intermediary transfer belt 7. Then, the toner images primary-transferred onto the intermediary transfer belt 7 are secondary-transferred onto the sheet at secondary transfer portion.

The respective image forming stations T to Bk have the substantially same constitution and for this reason, the image forming station T for forming the transparent image will be described representatively. The image forming station T is constituted by the photosensitive drum 1, a charging roller 2, the laser scanner 3, the developing device 4, and the drum cleaner 5. The photosensitive drum 1 having a drum shape as an image bearing member is shaft-supported rotatably by an apparatus main assembly. Around the photosensitive drum 1, the charging roller 2 as a charging means, the laser scanner 3 as an image exposure means, and the developing device as a developing means are disposed.

A surface of the photosensitive drum 1 is electrically charged to a uniform potential by the charging roller 2. Then, an image signal for forming a transparent toner image is inputted from the printer controller 108 into the laser scanner 3. The surface of the photosensitive drum 1 is irradiated with laser light, depending on the inputted image signal, by the laser scanner 3. As a result, electric charges at the surface of the photosensitive drum 1 are neutralized, so that an electrostatic latent image is formed on the surface of the photosensitive drum 1. Then, the electrostatic latent image formed on the surface of the photosensitive drum 1 is developed with transparent toner by the developing device 4. The transparent toner image obtained on the photosensitive drum 1 by the development is primary-transferred onto the intermediary transfer belt 7 as an image conveyance member by a primary transfer roller 6 disposed at a position opposite to the photosensitive drum 1 through the intermediary transfer belt 7. Transfer residual toner, remaining on the photosensitive drum 1, which has not been transferred onto the intermediary transfer belt 7 is collected by the drum cleaner 5. At the image forming station T, the transparent toner image is transferred onto the intermediary transfer belt 7 as described above. Toner images formed by other image forming stations Y, M, C and Bk are also similarly primary-transferred onto the intermediary transfer belt 7. Incidentally, the transparent toner image is first transferred onto the intermediary transfer belt 7 by the image forming station T. Therefore, when the image formation is effected by using the transparent toner, the transparent toner constituted an uppermost layer on the sheet. The transparent image forming station T for forming the transparent image is identical to other image forming stations for forming the color images except for the toner contained in the developing device 4. For that reason, depending on the image signal inputted into the laser scanner, the transparent image forming station T is capable of forming the transparent toner image on an entire sheet surface or on a part of the sheet surface.

The intermediary transfer belt 7 is stretched by the follower roller 7a, the secondary transfer opposite roller 7b, and the driving roller 7c. The follower roller 7a also functions as a tension roller, thus being rotated by the movement of the intermediary transfer belt 7 while imparting tension to the intermediary transfer belt 7. The secondary transfer opposite roller 7b is disposed opposite to a secondary transfer roller 9 through the intermediary transfer belt 7. Further, to the secondary transfer opposite roller 7b, a secondary transfer bias voltage is applied from a high-voltage power source (not shown) during the secondary transfer. The driving roller 7c is rotated by receiving a driving force from a driving motor (not shown). The intermediary transfer belt 7 stretched by the driving roller 7c is moved by the rotation of the driving roller 7c by receiving the driving force from the driving roller 7c.

In this manner, the toner images formed on the intermediary transfer belt 7 by the respective image forming stations T to Bk are conveyed to the secondary transfer portion. The toner images conveyed by the intermediary transfer belt 7 are transferred onto the sheet, conveyed to the secondary transfer portion, by applying a transfer bias to the secondary transfer roller 9 and the secondary transfer opposite roller 7c. Transfer residual toner, remaining on the intermediary transfer belt 7, which has not been transferred onto the sheet is collected by a belt cleaner 7d provided downstream of the secondary transfer portion.

In this manner, the toner images are transferred onto the sheet. The sheet onto which the toner images are transferred is conveyed to a fixing portion.

(Toner)

The toner accommodated in the developing device of the image form station will be described. In this embodiment, with respect to the transparent toner and the color toners, a polyester-based resin material is used. As a method of manufacturing the toner, a pulverization method and a method (polymerization method) for directly manufacturing the toner in a medium, such as a suspension polymerization method, an interfacial polymerization method, or a dispersion polymerization method can be used. In this embodiment, the toner manufactured by using the suspension polymerization method was used. The component and manufacturing method for the toner are not limited to those described above. Herein, the color toner is a generic name for yellow toner, cyan toner, magenta toner, and black toner, excluding the transparent toner.

The color toner is principally constituted by a polyester resin material and a pigment. Further, the transparent toner is principally constituted by the polyester resin material. The transparent toner and the color toners, used in this embodiment, have a glass transition point (Tg) of about 55° C. In this embodiment, the transparent toner was manufactured so as to have the glass transition point (Tg) substantially identical to that of the color toners. For that reason, in the case where the same fixing condition and the substantially same toner amount per unit area are employed for the transparent toner and the color toners, the color toners fixed on the sheet and the transparent toner fixed on the sheet have the substantially same glossiness.

The glass transition point (Tg) is not limited to that described above. When the type and a molecular weight of the resin material used for the transparent toner is changed, a melting property is also changed. For that reason, the toner image fixed on the sheet under the same fixing condition provides a different glossiness depending on a toner property. Therefore, by manufacturing the transparent toner with the use of a resin material which has the glass transition point (Tg) lower than that of the color toners and is therefore liable to melt, compared with the case of the color toners, it is possible to obtain the transparent toner having high glossiness after the fixation. Further, by manufacturing the transparent toner with the use of a resin material which has the glass transition point (Tg) higher than that of the color toners and is therefore less liable to melt, compared with the case of the color toners, it is possible to obtain the transparent toner having low glossiness after the fixation. In this way, it is also possible to use the transparent toner having the glass transition point (Tg) different from that of the color toners.

(Fixing Portion)

The fixing portion is constituted by the fixing device 10. The constitution of the fixing portion will be described along a flow of fixation of the transparent images transferred onto the sheet. The fixing device 10 is constituted by a fixing roller 10a and a pressing roller 10b. The fixing roller 10a and the pressing roller 10b press-contact each other and a fixing nip is formed therebetween. In this embodiment, outer diameters of the fixing roller 10a and the pressing roller 10b are both 80 mm. Further, lengths of the fixing roller 10a and the pressing roller 10b with respect to their rotational axis directions are both 350 mm. The fixing roller 10a is shaft-supported rotatably by another wall of the fixing device, and the pressing roller 10b is pressed against the fixing roller 10a with a pressure of 500 N by a spring (not shown). The fixing roller 10a is a laminated member including, on an aluminum-made hollow core metal, a rubber layer as an elastic layer and a fluorine-containing resin material layer as a toner parting layer which are laminated. Further, inside the hollow core metal, a halogen heater as a heating source is provided. The hollow core metal may also be formed of other materials such as iron. Further, the heating source may also be replaced with that of an IH (induction heating) type using, e.g., electromagnetic induction heating. The fixing roller 10a is connected to a driving motor through a driving gear train and is rotated by a rotational driving force transmitted from the driving motor. The pressing roller 10b is, similarly as the fixing roller 10a, a lamination member in which the rubber layer and the fluorine-containing resin material layer are laminated, and the halogen heater is provided inside the hollow core metal. Further, the pressing roller 10b is rotated by the rotation of the fixing roller 10a.

In the neighborhood of each of the surfaces of the fixing roller 10a and the pressing roller 10b, a thermistor as a detecting means for detecting a temperature of an associated surface is mounted. The respective thermistors can detect the temperatures of the fixing roller 10a and the pressing roller 10b. A temperature detection signal output from each of the thermistor is sent to the printer controller 108. As a result, the printer controller can control the temperatures of the fixing roller 10a and the pressing roller 10b.

In this embodiment, the printer controller 108 controls a halogen heater for each of the rollers 10a and 10b so that the temperature in the neighborhood of the surface of the fixing roller 10a is 155° C. and so that the temperature in the neighborhood of the surface of the pressing roller 10b is 100° C.

Under such a fixing condition, the sheet on which the toner images are transferred at the secondary transfer portion passes through the fixing nip. As a result, the toner images transferred on the sheet are fixed on the sheet. The sheet on which the toner images are fixed passed through a conveyance path and is discharged outside the image forming apparatus.

In this embodiment, the sheet is separated from the fixing device 10, in a state in which a high temperature of about 90°

C. to about 110° C. is kept, immediately after the sheet has passed through the fixing nip of the fixing device 10. The temperature at which the sheet is separated is affected by the fixing condition, the basis weight of the sheet, and the like. In this embodiment, the fixing device 10 constituted by a roller pair consisting of the fixing roller 10a and the pressing roller 10b is described above but may also be constituted by an endless belt for either one or both of a fixing side and a pressing side. The fixing method may also be those other than the above-described fixing method.

The constitution of the printer portion along the flow of the toner image formation on the sheet is described above.

The constitution of the MFP 100 is as described above.

(Relationship Between Toner Amount Per Unit Area and Glossiness)

Figure 5:
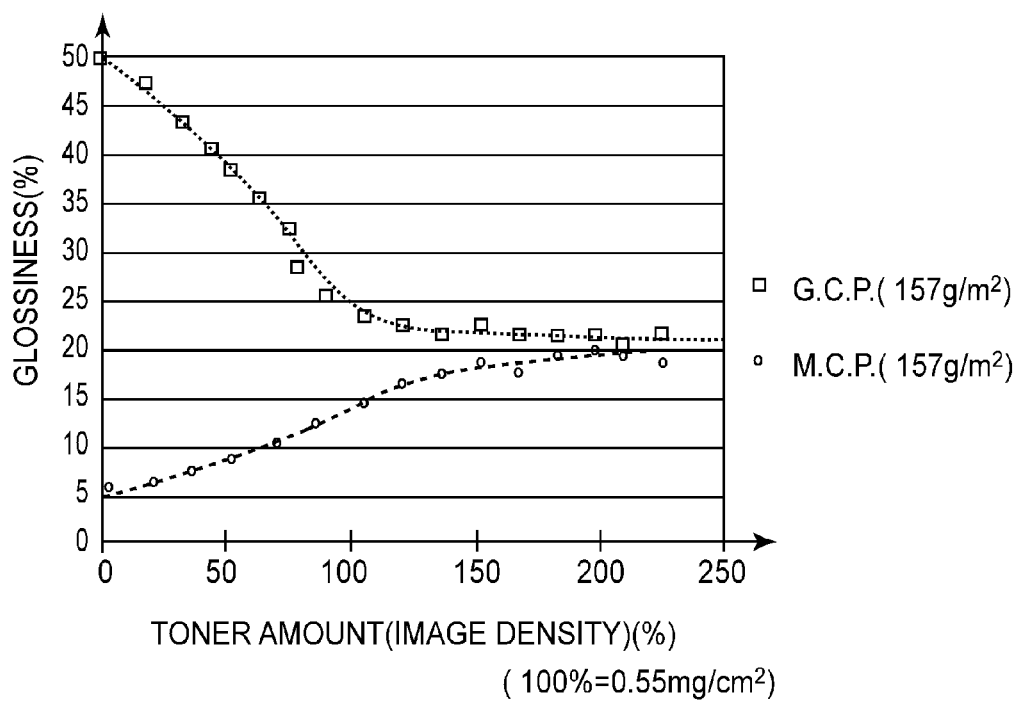
FIG. 5 is a graph showing a relationship between a change in toner amount and a change in glossiness with respect to highly glossy paper and low glossy paper.

FIG. 5 is a graph showing a relationship between the amount per unit area of the toner fixed on the sheet surface and the glossiness of the sheet surface on which the transparent image is fixed.

Various conditions which are considered to affect the glossiness of the sheet surface after the fixation will be enumerated below. As the sheet, matt coated paper (M.C.P.), "U-light" (trade name) (mfd. by Nippon Paper Industries Co., Ltd.; basis weight (B.W.)=157 g/m$^2$) was used. As gloss coated paper (G.C.P.), "Golden Cask Super Art" (trade name) (mfd. by Oji Paper Co., Ltd.); basis weight=157 g/m$^2$) was used. Further, the printer controller 108 controls the printer portion 115 so that the amount of the toner to be formed on the sheet is about 0.55 mg/cm$^2$ when a signal for the image density of 100% is input.

Further, the printer controller 108 controls the printer portion 115 so that the surface temperature of the fixing roller 10a is about 155° C. and a process speed at which the sheet passes through the fixing device is 90 mm/s.

Further, the toner used is, as described above, the toner which employs the polyester resin and has the glass transition point (Tg) of about 55° C.

Hereinafter, the sheet on which the glossiness is lowered after the transparent image fixation compared with the glossiness before the transparent image fixation is referred to as the highly glossy paper, and the sheet which is increased in glossiness compared with that before the fixation by fixing the toner is referred to as the low glossy paper. A degree of the glossiness lowering or increase varies depending on the fixing condition and the type of the toner.

As indicated by a broken line shown in FIG. 5, the paper "U-light" (basis weight=157 g/m$^2$) is classified into the low glossy paper since the glossiness at the portion where the toner is fixed is increased. Further, as indicated by a chain line shown in FIG. 5, the paper "Golden Cask Super Art" (basis weight=157 g/m$^2$) is classified into the highly glossy paper since the glossiness at the portion where the toner is fixed is decreased. With respect to the toner and under the fixing condition in this embodiment, the glossiness of the sheet as a threshold for classifying the sheet into the highly glossy paper and the low glossy paper is 20%. Incidentally, under the above condition, the glossiness of 20% corresponds to predetermined glossiness (threshold) used in the flow chart described later.

(Image Processing of MFP Along Flow Chart)

Figure 6:
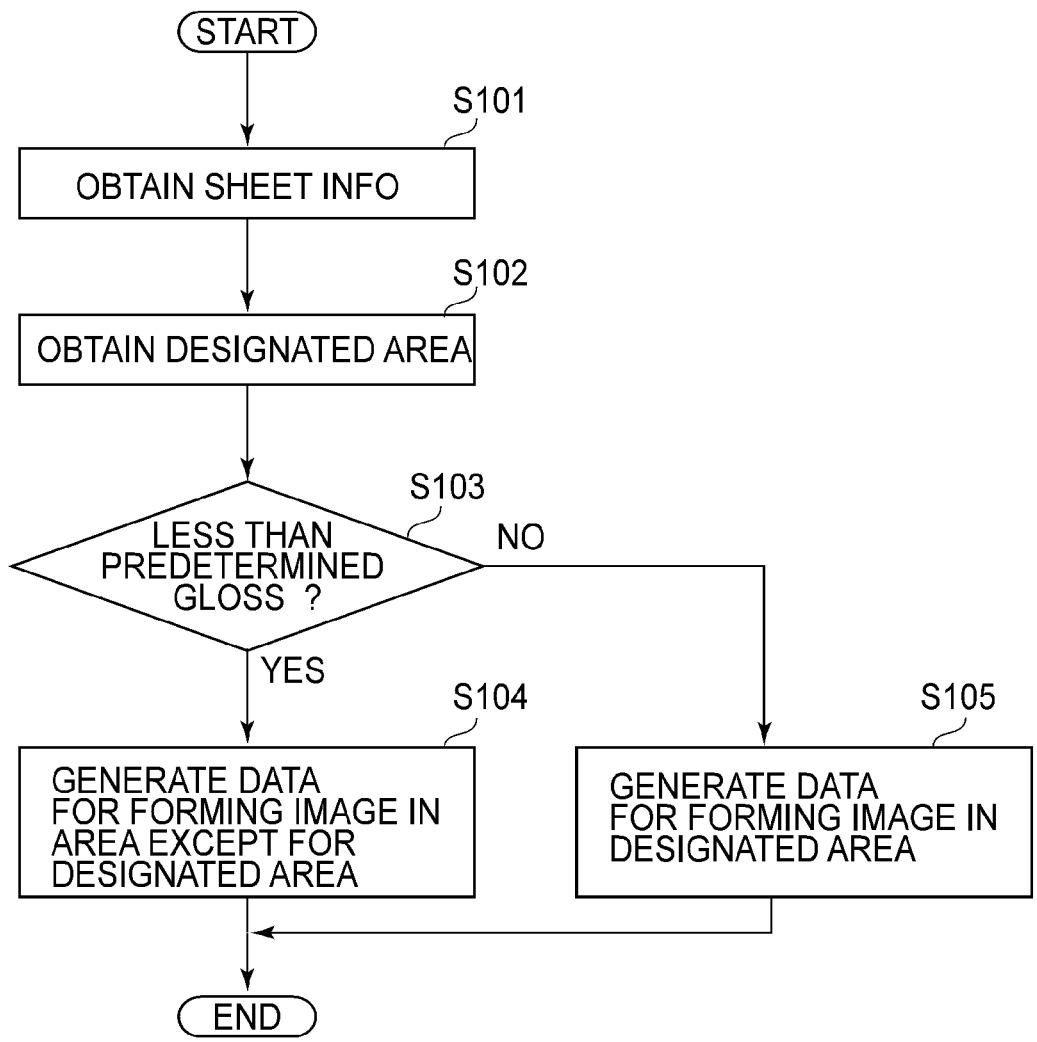
FIG. 6 is a flow chart showing an execution procedure of image processing in the embodiment of the present invention.

FIG. 6 is a flow chart for illustrating the procedure of the image processing. In this embodiment, the image processing which is characteristic processing is executed by the CPU 101 of the MFP 100. A flow of image processing executed by the CPU 101 in accordance with a program stored in the ROM 103 will be described below along the flow chart. Further, a specific example in which the MFP 100 operates in accordance with the image data generated in the CPU 101 will be described later.

Incidentally, as a processing method of generating the image data used for forming the color image at the printer portion (hereinafter referred to as color image data), a known method is used. For that reason, the explanation for the image processing of the color image data will be omitted.

S101 represents a step for obtaining information on the sheet. The CPU 101 as a sheet information obtaining means obtains the glossiness (data) as information corresponding to the glossiness of the sheet on which the image is to be formed. The CPU 101 holds the obtained glossiness information in the RAM 102.

S102 represents a step for obtaining information indicating an area, in which the glossiness is intended to be lowered, designated by the user. The CPU 101 as an area information obtaining means obtains the information indicating the area, in which the glossiness is intended to be lowered, designated by the user. The CPU 101 holds the obtained area information in the RAM 102.

S103 represents a step for determining the image data, for forming an image with the transparent toner, to be generated on the basis of the sheet glossiness obtained in the step S101 (hereinafter referred to as transparent image data). The CPU 101 executes processing in a step S104 when the sheet glossiness obtained in the step S101 is less than 20% as the predetermined threshold. Further, CPU 101 executes processing in a step S105 when the sheet glossiness obtained in the step S101 is 20% or more. As the predetermined threshold, under the above-described condition, the glossiness of 20% which is a boundary value for classifying the highly glossy paper and the low glossy paper is used. Incidentally, the predetermined threshold is not limited to a measure in terms of the glossiness but a similar measured may also be used as an alternative to the glossiness.

In the step S104, the CPU 101 as an image data generating means executes generating processing of the transparent image data in the case where the sheet glossiness is less than the predetermined glossiness. The transparent image data is used for forming the transparent image at the printer portion 115 in an image formable area except for the area obtained in the step S102. The transparent image data generate din this step is sent to the printer portion, so that the printer portion outputs the sheet on which the transparent toner image is formed and fixed in the image formable area except for the area obtained in the step S102. As a result, even in the case where the sheet is the low glossy paper, it is possible to provide the output product having the low glossiness in the area designated by the user.

Incidentally, in this embodiment, the transparent toner image is to be formed on the sheet so as to cover the color toner image based on the color image data. On the sheet, the color toner image may also be formed so as to cover the transparent toner image. Further, only the transparent toner image may also be formed on the sheet without forming the color image on the sheet. Hereinafter, the image formation is effected in a manner that the transparent toner image is formed on the sheet so as to cover the color toner image and is omitted from description.

The "image formable area" will be explained. Among printers which have been currently put into practical use, there are printers having a so-called "normal printing mode (with a border)" and printers having a so-called "borderless printing mode". Here, the "border" refers to a portion where the printer does not form the image with a width of several millimeters from an edge of the sheet. That is, when an instruction to add (place) the toner on the entire surface of the white paper is provided to the printer, a white portion on the output paper (sheet) is the "border". In the case of the "normal printing mode", the image formable area refers to an area except for the "border" of the sheet. In the case of the "borderless printing mode", the image formable area refers to the entire surface (area) of the sheet. The width of the "border" can appropriately be changed.

In the step S105, the CPU 101 as the image data generating means generates the transparent image data, in the case where the sheet glossiness is the predetermined threshold or more, used for forming the transparent image at the printer portion in the image formable area of the area obtained in the step S102. The transparent image data generate din this step is sent to the printer portion, so that the printer portion outputs the sheet on which the transparent toner image is formed and fixed in the area obtained in the step S102. As a result, even in the case where the sheet is the highly glossy paper, it is possible to provide the output product having the low glossiness in the area designated by the user.

By operating the image forming apparatus as described above, irrespective of the glossiness of the sheet on which the transparent toner image is to be formed, the glossiness in the area in which the user wishes to lower the glossiness can be lowered.

(Operation for Forming Transparent Image (Data) on Sheet)

A specific example of the operation of the MFP 100 will be described below. As shown in FIG. 3, the MFP 100 includes the cassette 13a and 13b. In the following description, "cassette 1" corresponds to the cassette 13a in FIG. 3 and the "cassette 2" corresponds to the cassette 13b in FIG. 3. Incidentally, the "manual feeding tray" corresponds to the manual feeding tray 14 in FIG. 3. Further, in the following description, in the "cassette 1", the paper "Golden Cask Super Art" (basis weight=157 g/m$^2$) is set as the gloss coated paper. In the "cassette 2", the paper "U-light" (basis weight=157 g/m$^2$) is set as the matt coated paper. Incidentally, "A CO. G.C.P. B.W. (A company: gloss coated paper; basis weight) 157 g/m$^2$" displayed on the display corresponds to the paper "Golden Cask Super Art" (basis weight=157 g/m$^2$). Further, "B CO. M.C.P. B.W. (B company; matt coated paper; basis weight) 157 g/m$^2$" corresponds to the paper "U-light" (basis weight=157 g/m$^2$). Based on these premises, a flow of generation of the image data by the CPU 101 along the flow chart shown in FIG. 6 and formation of the image on the sheet at the printer portion 115 in accordance with the generated image data will be specifically described.

(MFP Operation Depending on Input by User)

In order to lower the glossiness in the area designated by the user, the MFP 100 obtains "information on sheet glossiness" and "information on area in which glossiness is intended to be partly lowered". The procedure for inputting the "information on sheet glossiness" and the "information on area in which glossiness is intended to be partly lowered" into the MFP 100 is described below.

Hereinafter, the "information on sheet glossiness" and the "information on area in which glossiness is intended to be partly lowered" are referred to as transparent print setting information (information required to be set for printing the transparent image).

The MFP 100 displays the screens shown in FIG. 7 to FIG. 10 at the display 111 in order to obtain the transparent print setting information. A transition among the respective screens will be summarized.

Figure 7:
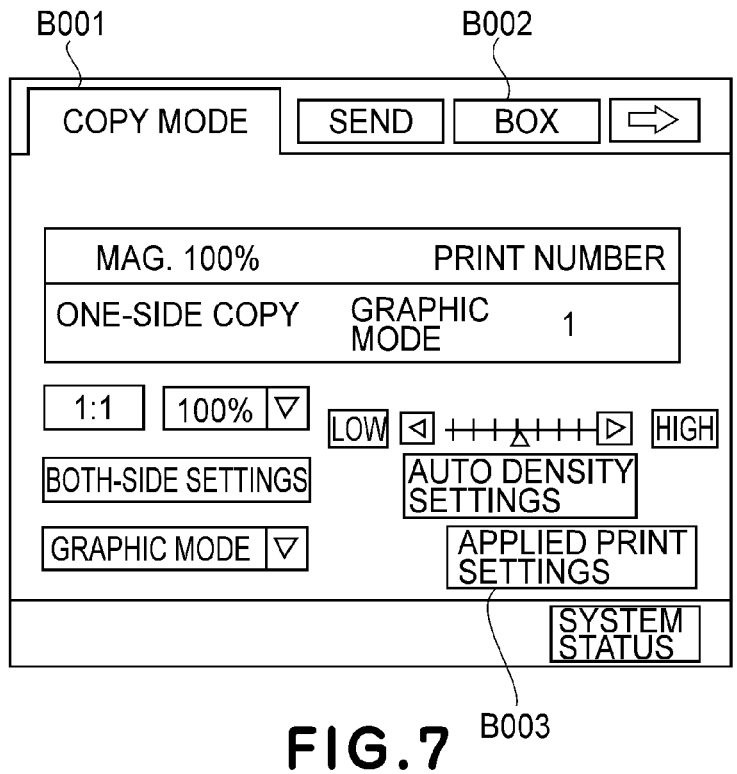
FIGS. 7 to 10 are schematic views each showing an example of a screen displayed on a display of the MFP in the embodiment of the present invention.

(Explanation for Screen Shown in FIG. 7)

FIG. 7 is a schematic view showing an example of the screen displayed at the display 111. In a state in which the screen shown in FIG. 7 is displayed at the display 111 (in a copy mode), when a start button (not shown) is pushed down by the user, the MFP 100 makes a copy of the original set on the original carriage. Incidentally, when B 002 is selected, the mode of the MFP 100 is switched to a box mode. In the box mode, the user can output the data, stored in the HDD inside the MFP 100, at the printer portion. When the user selects B 001, the mode of the MFP 100 is switched from the box mode to the copy mode.

In FIG. 7, the user can select B003 for "APPLIED PRINT SETTINGS". When the user selects "TRANSPARENT PRINT SETTING" (not shown) in the "APPLIED PRINT SETTINGS", the MFP 100 displays the screen shown in FIG. 8 at the display 111.

Figure 8:
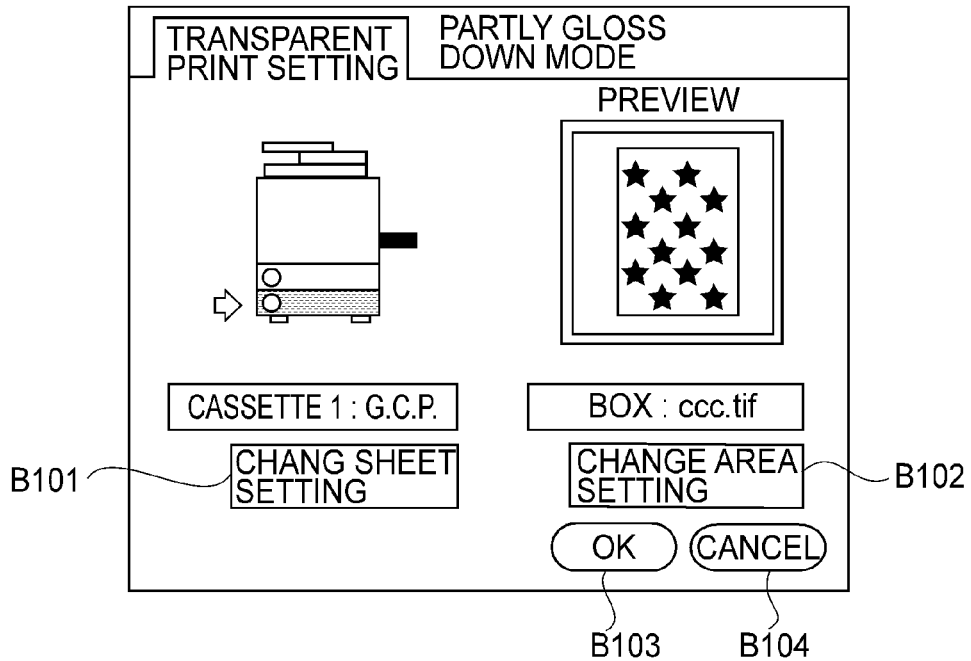

(Explanation for Screen Shown in FIG. 8)

Figure 9:
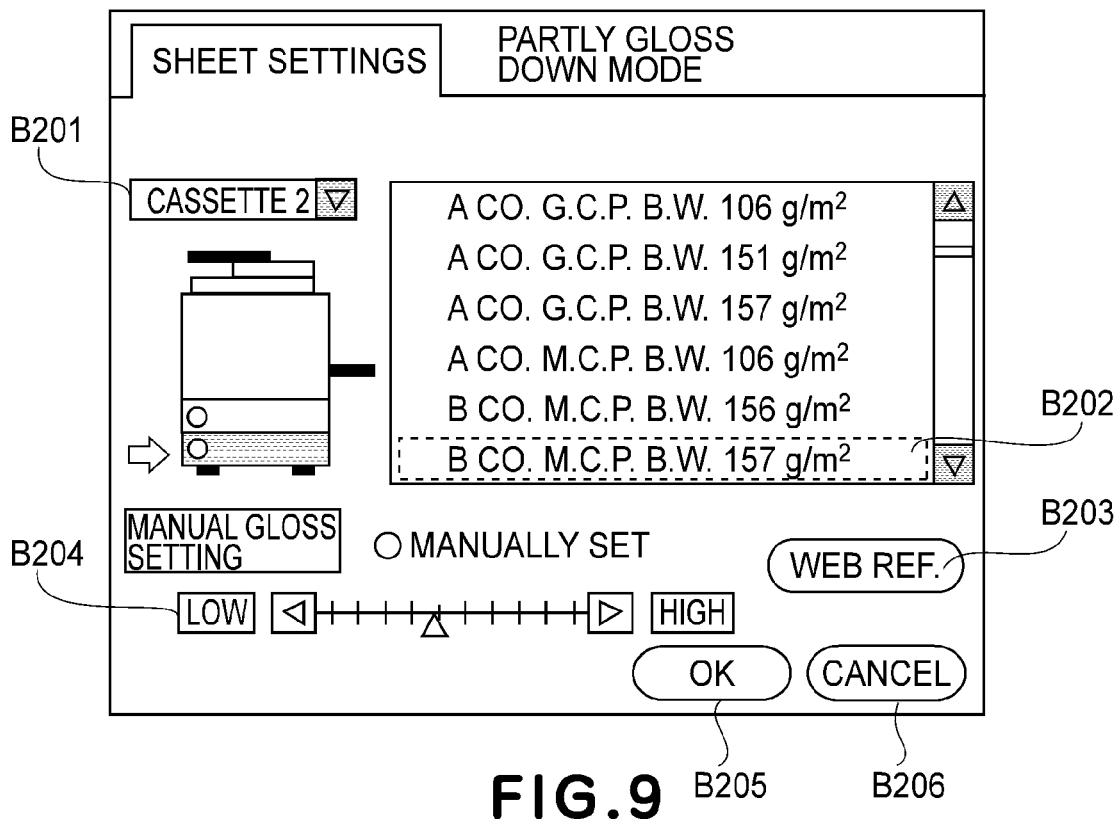
Figure 10:
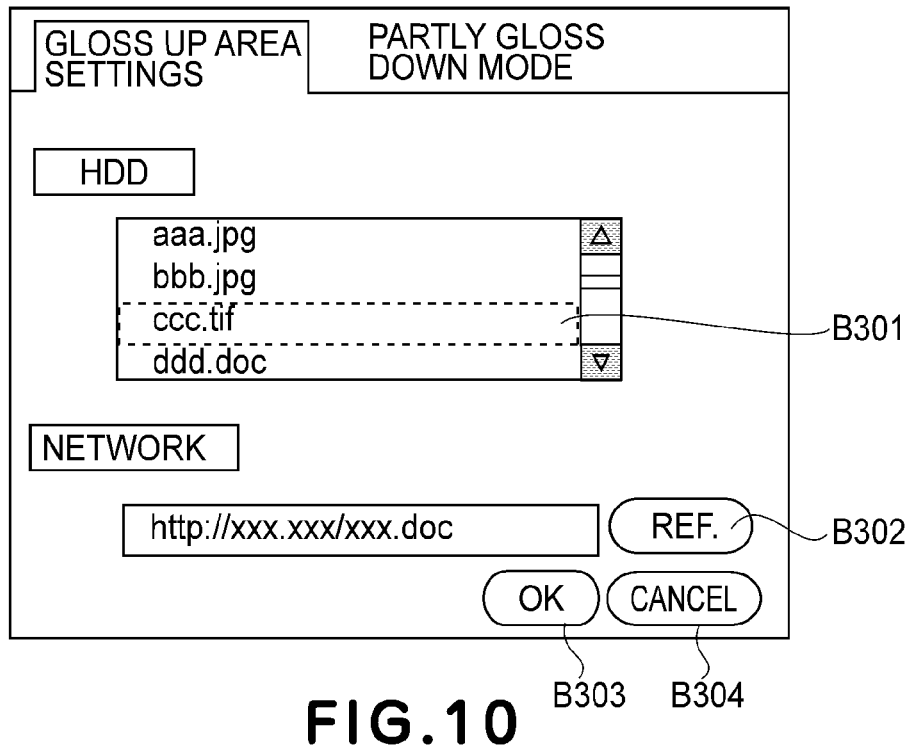

FIG. 8 is a schematic view showing the example of the screen showing a setting status when the printing is effected by using the transparent toner. The MFP displays the screen as shown in FIG. 8 at the display 111. As a result, the MFP 100 urges the user to input the transparent print setting information. When the user selects a button B101 on the screen shown in FIG. 8 displayed at the display 111, the MFP 100 displays at the display 111 the screen, as shown in FIG. 9, urging the user to input the "information on sheet glossiness" as the transparent print setting information". Similarly, when the user selects a button B102 on the screen shown in FIG. 8 displayed at the display 111, the MFP 100 displays at the display 111 the screen, as shown in FIG. 10, urging the user to input the "information on area in which glossiness is to be intended to be partly lowered" as the transparent print setting information.

As a result, the user can set the transparent print setting information.

In a state in which the transparent print setting information is set, the user can reflect the transparent print setting information by selecting a button B 103 (OK button). In the case where the user selects the button B103 (OK button), the MFP 100 displays the screen shown in FIG. 7 at the display 111. Therefore, the user can effect the information on the basis of the transparent print settings by pushing down the start button.

Further, the user can destruct the transparent print setting information by selecting a button B104 (cancel button). In the case where the user selects the button B104 (cancel button), the MFP 100 displays the screen shown in FIG. 7 at the display 111.

(Explanation for Screen Shown in FIG. 9)

FIG. 9 is a schematic view showing the example of the screen for urging the user to input the "information on sheet glossiness". The user can select the cassette 13a, the cassette 13b, and the manual feeding tray 14, each in which the sheets used for printing are set, as shown in FIG. 3. When the user selects B201, the "CASSETTE 1", the "CASSETTE 2", and the "MANUAL FEEDING TRAY" are selectably presented on the display 111 in the form of a pull-down menu. It is also possible to employ other option presentation methods such as a pop-up menu and the like menu. The user selects the item, in which (on which) the sheets used for printing are set, from the presented items. As shown in FIG. 9, when the user selects the "CASSETTE 2", on the display 111, the type of sheets selectable by the user is presented in list form. As described above, the paper ("Golden Cask Super Art"; basis weight=157 g/m$^2$ has been set in the "CASSETTE 1" and the paper ("U-light"; basis weight=157 g/m$^2$) has been set in the "CASSETTE 2". For that reason, in the case where the "CASSETTE 2" is selected from the selectably presented pull-down menu, the CPU 101 controls a cursor B202 so as to be positioned at "B CO. M. C. P. B. W. (B company; matt coated paper; basis weight) 157 g/m² " corresponding to the paper ("U-light"; basis weight=157 g/m²). Further, in the case where the "CASSETTE 1" is selected from the selectably presented pull-down menu, the CPU 101 controls the cursor B202 so as to be positioned at "A CO. G. C. P. B. W. (A Company; gloss coated paper; basis weight) 157 g/m²" corresponding to the paper ("Golden Cask Super Art"; basis weight=157 g/m²). For example, in the case where the user sets the "A CO. G. C. P. B. W. 157 g/m²" in the "CASSETTE 1", the user performs the following operation. First, the user selects the "CASSETTE 2" (B201). Then, the user operates the cursor (B202) so as to be positioned at "B CO. M.C.P. B.W. 157 g/m²". By performing such an operation, the user can designate the type of the sheet used for printing with respect to the MFP 100. The MFP 100 holds data shown in Table 1 below indicating the types of sheets presented in FIG. 9. For that reason, when the user selects the "A CO. G. C. P. B. W. 106 g/m²", the CPU 101 as a sheet information obtaining means can obtain glossiness of "30%" of the sheet used for printing. Further, e.g., when the user selects the "B CO. M. C. P. B. W. 157 g/m²", the CPU 101 as the sheet information obtaining means can obtain glossiness of "6%" of the sheet used for printing.

TABLE 1

| Company | Sheet type | B.W. (g/m²) | glossiness (%) | Class *1 |
|---|---|---|---|---|
| A | G.C.P. | 106 | 30 | H.G.P. |
| A | G.C.P. | 151 | 40 | H.G.P. |
| A | G.C.P. | 157 | 50 | H.G.P. |
| A | M.C.P. | 106 | 10 | L.G.P. |
| B | M.C.P. | 156 | 9 | L.G.P. |
| B | M.C.P. | 157 | 6 | L.G.P. |

*1: "H.G.P." represents highly glossy paper and "L.G.P." represents low glossy paper.

However, it can be considered that the type of the sheet set in the "CASSETTE 2" is not present in the list presented on the display 111. In that case the user can select a button B203, so that the user can access, e.g., a database which manages information prepared through the network. The user can select the type of the sheet, set in the "CASSETTE 2", from the database. As a result, the user can select the type of the sheet other than those presented in the list form.

Further, the user can manually input the glossiness of the sheets set in the "CASSETTE 1", "CASSETTE 2", and "MANUAL FEEDING TRAY". In the screen shown in FIG. 9, the user can set information on the glossiness of the set sheet by using a slider bar as shown at a portion B204. When the user sets the information on the glossiness of the sheet by using the slider bar, as shown in FIG. 9, the user can designate the information on the sheet glossiness in multiple levels (in 10 levels from 0% to 100% in FIG. 9). The input means by which the user designates, the sheet glossiness is not limited to the slider bar. For example, the MFP 100 displays, at the display 111, a "button" to be selected by the user in the case where the glossiness of the set sheet is high. The user selects the "button" displayed at the display 111 when the user judges that the glossiness of the set sheet is high. The information on the sheet glossiness may also be set by such a method. Thus, in the MFP 100, the user can designates the information corresponding to the glossiness of the sheet used for printing.

In this specific example, as shown in FIG. 9, as the sheet used for printing, the "B CO. M.C.P. B.W. 157 g/m²" is used. In the case where the user wishes to reflect the settings of the sheet used for printing, the user can select a button B205 (OK button). As a result, the settings of the sheet used for printing are completed, and then the MFP 100 displays the screen shown in FIG. 8 at the display 111. The information set by the user in this way is stored in the RAM 102. The thus-stored information on the sheet glossiness in the RAM 102 is obtained by the CPU 101 in the step S101. Further, in the case where the user do not wish to reflect the settings of the sheet used for printing, the user can select a button B206 (cancel button). As a result, the settings of the sheet used for printing are destructed, and then the MFP 100 displays the screen shown in FIG. 8 at the display 111.

(Explanation for Screen Shown in FIG. 10)

FIG. 10 is a schematic view showing the example of the screen for urging the user to input the "information area in which glossiness is intended to be partly lowered". In FIG. 10, files stored in the HDD 104 inside the MFP 100 are displayed in a selectable manner in list form. As a result, the user can designate (select) the file, indicating the area in which the glossiness is relatively lowered, from the files stored in the HDD 104. In this example, a file "ccc.tif" is designated with a cursor B301 by the user. In this way, the area in which the user wishes to increase the glossiness can be designated by the image (file). Here, the file "ccc.tif" is a file for the image as shown at a preview display portion shown in FIG. 8. In the image shown at the preview display portion, a marked portion (★★ portion) is the area in which the user wishes to lower the glossiness. Incidentally, the area in which the user wishes to lower the glossiness may also be designated by using another means other than the file stored in the HDD 104. For example, a method in which an external file is designated through the Ethernet 1/F 114 may also be employed. The user can designate the file other than the file stored in the HDD 104 by selecting a button B302. Incidentally, the area designating method is not limited thereto.

In this specific example, as shown in FIG. 10, the designation of the area in which the glossiness is intended to be lowered is made by the file "ccc.tif" stored inside the HDD 104. In the case where the user wishes to reflect the above-described settings, the user can select a button B303 (OK button). As a result, the settings are reflected, and then the MFP 100 displays the screen shown in FIG. 8 at the display 111. The information set by the user in this way is stored in the RAM 102. The thus-stored information, for designating the area in which the glossiness is intended to be lowered, in the RAM 102 is obtained by the CPU 101 in the step S102. Further, in the case where the user do not wish to reflect the settings, the user can select a button B304 (cancel button). As a result, the settings are destructed, and then the MFP 100 displays the screen shown in FIG. 8 at the display 111.

(MFP Operation on the Basis of Transparent Print Setting Information)

In the state in which the transparent print setting information is reflected, when the start button (not shown) is pushed, a color image data (RGB) is obtained from the original set at the screen portion. The obtained color image data (RGB) is subjected to color image processing. In this embodiment, the original (R: 100%, G: 100%, B: 50%) is subjected to a known color image processing and then is converted into a signal indicating 50%-density of yellow alone. On the basis of the resultant color image data (C: 0%, M: 0%, Y: 50%, K: 0%) and the transparent print setting information, the MFP performs the following operation.

(MFP Operation in Case of Using Low Glossy Paper for Printing)

Figure 11:
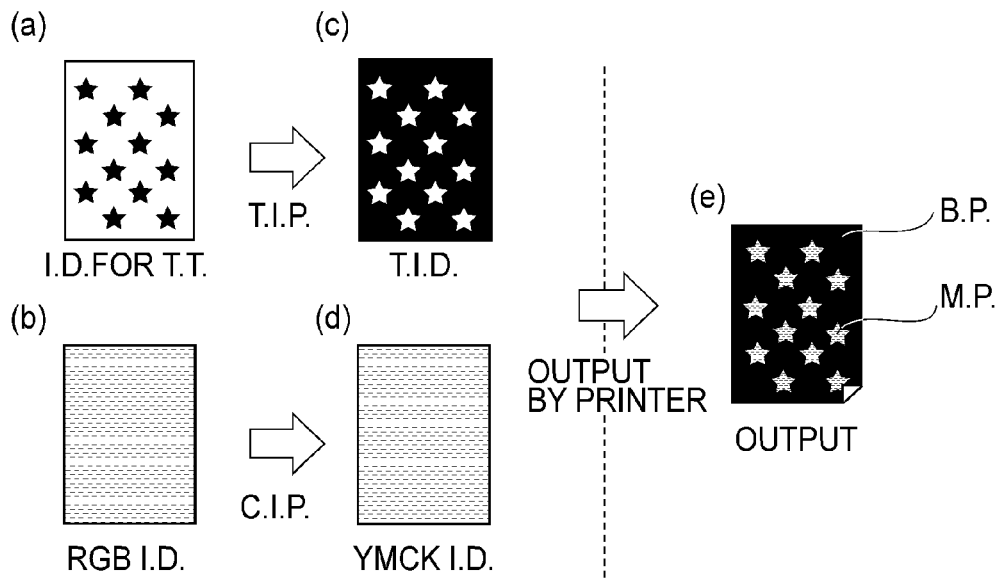
FIGS. 11(a) to 11(e) and FIGS. 12(a) to 12(e) are schematic views for illustrating an image to be processed by and a print output by an image processing apparatus in the embodiment of the present invention.

In the case where the transparent print setting information includes "U-light" (basis weight=157 g/m²) (glossiness=6%) and "ccc.tif", the MFP 100 operates in the following manner. FIGS. 11(*a*) to 11(*e*) are schematic views for illustrating an image to be processed by and a print to be output by the MFP. With reference to FIGS. 11(a) to 11(e), processing performed in respective steps shown in the flow chart of FIG. 6 will be described.

In the steps S101 and S102, the CPU 101 obtains the transparent print setting information stored in the RAM 102 as described above. FIG. 11(a) shows the image data of the file "ccc.tif" corresponding to "information on area in which glossiness is intended to be partly lowered".

In the step S103, the CPU 101 judges whether or not the information (glossiness) stored in the RAM 102 is less than the predetermined glossiness. Here, the sheet set in the "CASSETTE 2" as selected on the screen shown in FIG. 9 is the "matt coated paper (M.C.P.)". The paper "B CO. M.C.P. B.W. 157 g/m$^2$) provides "glossiness=6%". For that reason, the glossiness of the sheet is lower than the predetermined glossiness of 20% in this embodiment. Therefore, the CPU 101 performs the processing in the step S104.

In the step S104, the CPU 101 generates transparent image data (FIG. 11(c)) for selectively forming the transparent toner image in the image formable area except for the area (FIG. 11(a)), in which the user wishes to relatively lower the glossiness, the information on which is stored in the RAM 102. In this embodiment, the image data (file) "ccc.tif" for designating the area in which the user wishes to relatively lower the glossiness is stored in the HDD 104. Incidentally, in the case where the image data for designating the area in which the user wishes to relatively lower the glossiness is not the image data such as "tif" file but is described by the PDL, the file described by the PDL is subjected to the RIP by the CPU 101 and the dedicated image processing circuit 106. As a result, the CPU 101 can prepare the transparent image data for selectively forming the transparent toner image in the image formable area except for the area (data or file) described by the PDL.

The CPU 101 sends the transparent image data (FIG. 11(c)) prepared in the step S104 to the printer controller 108.

Further, the CPU 101 converts RGB data (FIG. 11(b)) into YMCK image data (FIG. 11(d)) by a known color image processing method. The CPU 101 sends the converted YMCK image data (FIG. 11(d)) to the printer controller 108.

The printer controller 108 controls the printer portion 115 on the basis of the received transparent image data (FIG. 11(c)) and the received YMCK image data (FIG. 11(d)). As a result, the printer portion 115 outputs the transparent image on the matt coated paper set in the "CASSETTE 2" in the image formable area except for the portion (area) designated by the selected file. Thus, the print shown in FIG. 11(e) is output.

The respective portions of the print (FIG. 11(e)) will be described below. The marked portion (★★ portion) corresponds to the area in which the user wishes to relatively lower the designated glossiness. Further, a background portion refers to the image formable area except for the area in which the user wishes to relatively lower the designated glossiness.

Table 2 shows data for illustrating the glossiness at the marked portion (M.P.) and the glossiness at the background portion (B.P.) and the data will be explained below.

TABLE 2

|  |  | M.P. | B.P. |
|---|---|---|---|
| Image density signal (%) | Color | 50 | 50 |
|  | Transparent | 0 | 100 |
| Toner amount (mg/cm$^2$) |  | 0.27 | 0.82 |
| 60°-glossiness (%) |  | 8 | 18 |

As described above, a density signal of the YMCK image data shown in FIG. 11(d) is 50% with respect to yellow alone. Further, a density signal of the transparent image data is 100% with respect to transparent alone. In this case, the marked portion, the yellow transparent image is formed with 50%-density. At the background portion, the yellow transparent image is formed with 50%-density and the transparent toner image is formed with 100%-density. That is, at the marked portion, the toner image is formed with 50%-density (yellow transparent image: 50%). At the background portion, the toner image is formed with 150%-density in total (yellow transparent image: 50%+transparent toner image: 100%).

As a result, the glossiness at the marked portion formed with 50%-density on the matt coated paper as the low glossy paper is 8% and the glossiness at the background portion formed with 150%-density on the gloss coated paper is 18% (on the basis of the relationship shown in FIG. 5).

Therefore, the glossiness of 8% at the marked portion is lower than the glossiness of 18% at the background portion. As a result, with respect to the matt coated paper as the low glossy paper, the glossiness at the marked portion can be made relatively lower than the glossiness at the background portion.

(MFP Operation in Case of Using Highly Glossy Paper for Printing)

Figure 12:
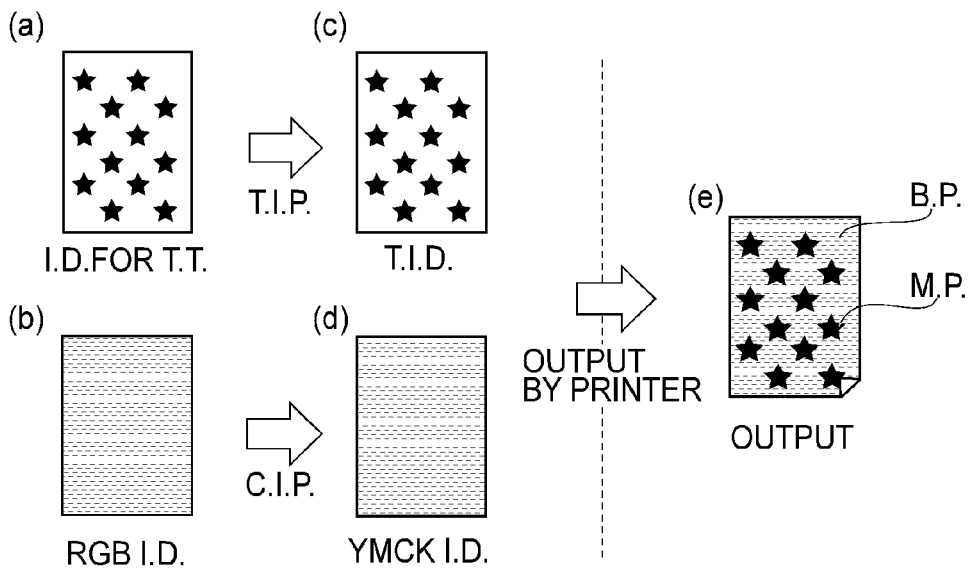

In the case where the transparent print setting information includes "Golden Cask Super Art" (basis weight=157 g/m$^2$) (glossiness=50%) and "ccc.tif", the MFP 100 operates in the following manner. FIGS. 12(a) to 12(e) are schematic views for illustrating an image to be processed by and a print to be output by the MFP. With reference to FIGS. 121(a) to 12(e), the processing performed in respective steps shown in the flow chart of FIG. 6 will be described.

In the steps S101 and S102, the CPU 101 obtains the transparent print setting information stored in the RAM 102 as described above. FIG. 12(a) shows the image data of the file "ccc.tif" corresponding to "information on area in which glossiness is intended to be partly lowered".

In the step S103, the CPU 101 judges whether or not the information (glossiness) stored in the RAM 102 is less than the predetermined glossiness. Here, the sheet set in the "CASSETTE 1" as is the "gloss coated paper (M.C.P.)". The paper "A CO. G.C.P. B.W. 157 g/m$^2$) provides "glossiness=50%". For that reason, the glossiness of the sheet is higher than the predetermined glossiness of 20% in this embodiment. Therefore, the CPU 101 performs the processing in the step S105.

In the step S105, the CPU 101 generates transparent image data (FIG. 12(c)) for selectively from the transparent toner image in the area (FIG. 12(a)), in which the user wishes to relatively lower the glossiness, the information on which is stored in the RAM 102. In this embodiment, the image data (file) "ccc.tif" for designating the area in which the user wishes to relatively lower the glossiness is stored in the HDD 104.

The CPU 101 sends the transparent image data (FIG. 12(c)) prepared in the step S105 to the printer controller 108.

Further, the CPU 101 converts RGB data (FIG. 12(b)) into YMCK image data (FIG. 12(d)) by a known color image processing method. The CPU 101 sends the converted YMCK image data (FIG. 12(d)) to the printer controller 108.

The printer controller 108 controls the printer portion 115 on the basis of the received transparent image data (FIG. 12(c)) and the received YMCK image data (FIG. 12(d)). As a result, the printer portion 115 outputs the transparent image on the gloss coated paper set in the "CASSETTE 1" in the image formable area designated by the selected file. Thus, the print shown in FIG. 12(e) is output.

The respective portions of the print (FIG. 12(e)) will be described below.

Table 3 shows data for illustrating the glossiness at the marked portion (M.P.) and the glossiness at the background portion (B.P.) and the data will be explained below.

TABLE 3

|  |  | M.P. | B.P. |
|---|---|---|---|
| Image density signal (%) | Color | 50 | 50 |
|  | Transparent | 100 | 0 |
| Toner amount (mg/cm$^2$) |  | 0.82 | 0.27 |
| 60°-glossiness (%) |  | 22 | 35 |

As described above, a density signal of the YMCK image data shown in FIG. 12(d) is 50% with respect to yellow alone. Further, a density signal of the transparent image data is 100% with respect to transparent alone. In this case, the marked portion, the yellow transparent image is formed with 50%-density and the transparent toner image is formed with 100%-density. At the background portion, the yellow transparent image is formed with 50%-density. That is, at the marked portion, the toner image is formed with 150%-density in total (yellow transparent image: 50%+transparent toner image: 100%). At the background portion, the toner image is formed with 50%-density (yellow transparent image: 50%).

As a result, the glossiness at the marked portion formed with 150%-density on the gloss coated paper as the highly glossy paper is 22% and the glossiness at the background portion formed with 50%-density on the matt coated paper is 35% (on the basis of the relationship shown in FIG. 5).

Therefore, the glossiness of 22% at the marked portion is lower than the glossiness of 35% at the background portion. As a result, with respect to the gloss coated paper as the highly glossy paper, the glossiness at the marked portion can be made relatively lower than the glossiness at the background portion.

As described above, by employing the constitution in this embodiment, even in the case where the sheet glossiness is high, the glossiness in the area designated by the user can be relatively lowered.

(Comparison with Another Method)

After the color image is transferred onto the sheet and is fixed by the fixing device, the transparent image is formed on the sheet on which the color image has been formed, so that the glossiness in the area in which the transparent image is formed can be lowered. This method is referred to as a comparative method and will be briefly described and then will be compared with the method in the present invention. Incidentally, the sheet on which an image is to be formed is the low glossy paper.

(Apparatus for Realizing Comparative Method)

Figure 19:
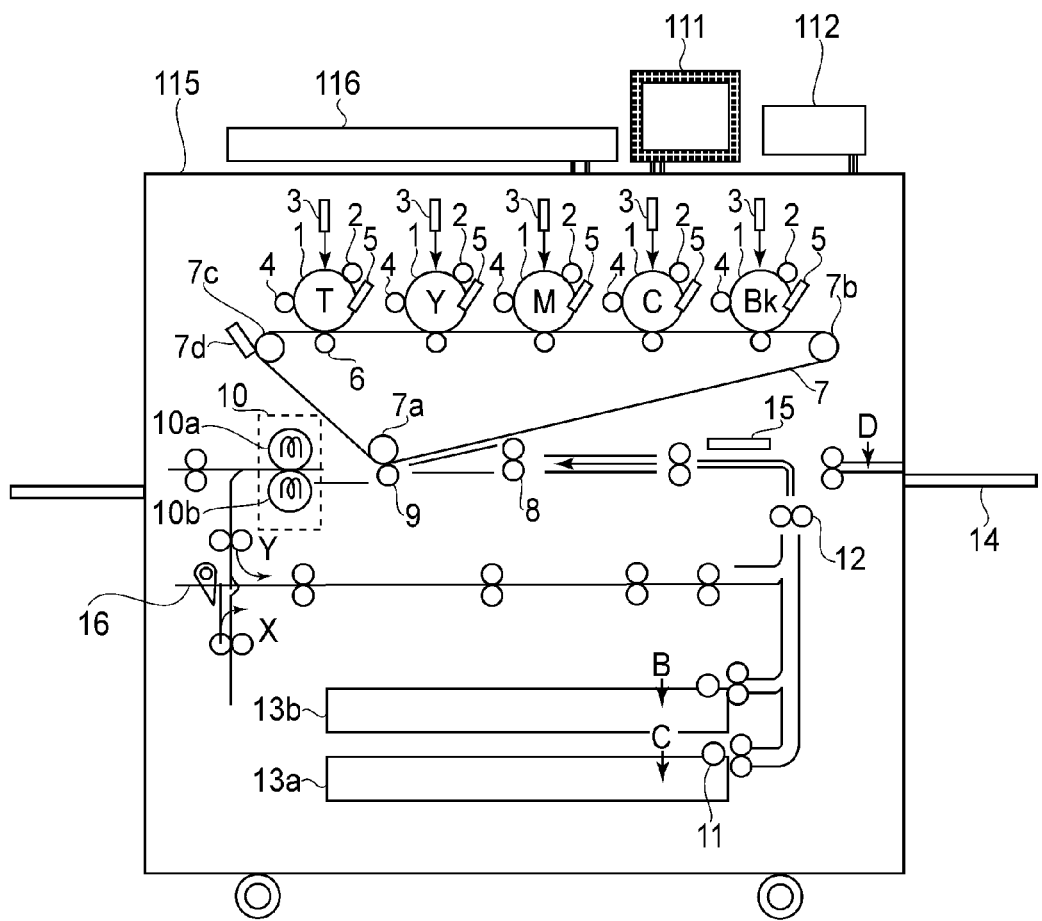
FIG. 19 is a schematic view showing a preferred MFP for realizing a comparative method.

In order to realize the comparative method, the image forming apparatus is required to transfer and fix the transparent image on the surface of the sheet on which the color image has been transferred and fixed. FIG. 19 is a schematic view showing a preferable MFP for realizing the comparative method. The MFP shown in FIG. 19 is provided with a flapper 16 at a position P indicated in FIG. 3.

The flapper 16 changes the conveyance direction of the sheet in accordance with an instruction from the printer controller. In the case where the toner image is formed again on the sheet surface on which the toner image has been formed, the flapper 16 moves to a position in which the sheet is to be conveyed in a direction indicated by an arrow Y in FIG. 19. Further, in the case where the toner image is formed on a (back) surface opposite from the surface on which the toner image has been formed (i.e., both-side printing), the flapper 16 moves to a position in which the sheet is to be conveyed in a direction indicated by an arrow X in FIG. 19.

Also in a constitution in which the flapper is not used, it is possible to form the transparent toner image on the sheet surface on which the color image has been formed. That is, in the constitution in which the flapper is not used, the image forming apparatus can transfer the transparent image onto the sheet surface, on which the color image has been formed, by utilizing a feeding (conveying) path for the both-side printing.

For example, the image forming apparatus forms the color image on the front surface of the sheet and turns the sheet upside down by using the feeding path for the both-side printing, and then forms the color image on the back surface of the sheet. Further, the image forming apparatus turns the sheet upside down and then forms the transparent image on the front surface of the sheet. Thereafter, the image forming apparatus turns the sheet upside down and then forms the transparent image on the back surface of the sheet. As a result, without using the flapper, it is possible to form the transparent image on the sheet surface on which the color image has been formed.

However, in the case of the one-side printing for forming the color image on one side of the sheet, a conveyance distance of the sheet is unnecessarily increased, so that the image forming apparatus may preferably be provided with the flapper.

(Image Forming Condition Used in Comparative Method)

In the comparative method, a "transparent toner image forming area" is designated by the image data (file) "ccc.tif". Incidentally, for convenience of explanation, the instruction is provided so that the transparent toner image is to be formed at the marked portion (★★ portion) of the image data "ccc.tif". The transparent image data used for forming the transparent toner image is sent to the printer controller. Incidentally, after the conversion, the transparent image data is a signal providing a image density of 100%. On the other hand, in the method in the present invention, in order to designate the "area in which glossiness is intended to be increased", the image data "ccc.tif" was used.

With respect to the color image, as the color image in Comparative Embodiment 1, an image to be converted into a signal providing 80%-density for yellow alone is used. Further, as the color image in Comparative Embodiment 2, an image to be converted into a signal providing 20%-density for yellow alone is used.

The image forming apparatus for outputting the image in Comparative Embodiment 1 and Comparative Embodiment 2 has the substantially same constitution as that of the image forming apparatus used in the method in the present invention. In the comparative method, similarly as in the method in the present invention, the printer controller controls the printer portion 115 so that the amount of the toner to be formed on the sheet is about 0.55 mg/cm$^2$ when 100%-image density signal is input. Further, the printer controller controls the printer portion 115 so that the surface temperature of the fixing roller 10a is about 155° C. and so that the process speed is 90 mm/sec. Further, as the sheet on which the image is to be formed, the paper ("U-light"; basis weight=157 g/m$^2$) is used.

Comparative Embodiment 1

80%-Color Image Density

In Comparative Embodiment 1, the color image is formed of the yellow toner with uniform 80%-density in the image formable area. Specifically, the image forming apparatus forms the yellow toner image on the entire surface of the sheet with 80%-density under the above-described image forming condition. That is, the image forming apparatus transfers the yellow toner image onto the sheet at the secondary transfer portion and then fixes the transferred yellow toner on the sheet by the fixing device.

Then, the image forming apparatus conveys the sheet, on which the yellow toner image has been fixed at the entire surface of the sheet, again to the secondary transfer portion. The image forming apparatus forms the transparent toner image on the sheet, which has been conveyed to the secondary transfer portion, at the marked portion (★★ portion) designated by the file "ccc.tif".

The glossiness of the output sheet at the marked portion (M.P.) and the glossiness of the output sheet at the background portion (B.P.) in the case where the transparent toner image and the color toner image are separately formed were as shown in Table 4 below.

TABLE 4

|  | Invention | | C.E. 1 *1 | |
| --- | --- | --- | --- | --- |
|  | M.P. | B.B. | M.P. | B.P. |
| I.D. (T.A.) (%) *2 | 80 | 180 | 180(100) *3 | 80 |
| 60° C.-glossiness (%) | 14 | 23 | 23 | 38 |

*1: "C.E. 1" represents Comparative Embodiment 1.
*2: "I.D.(T.A.)" represents the image density (toner amount).
*3: "180(100)" means that the color toner image is fixed with 80%-density (first fixation) and the transparent toner image is then fixed with 100%-density (second fixation), so that the color toner image and the transparent toner image are fixed with 180%-density in total.

At the marked portion in Comparative Embodiment 1, the yellow toner image is formed with 80%-density and the transparent toner image is formed with 100%-density. Further, at the background portion in Comparative Embodiment 1, the yellow toner image is formed with 80%-density. That is, the image is formed with 180%-toner amount at the marked portion and is formed with 80%-toner amount at the background portion.

As a result, the glossiness at the marked portion (★★ portion) on the matt coated paper as the low glossy paper is 23% and the glossiness at the background portion on the matt coated paper is 38%.

Therefore, the glossiness at the marked portion (★★ portion) at which the transparent toner image is formed after the color toner image is fixed is relatively lower than the glossiness at the background portion. This is because the glossiness is increased at the background portion, which has not been subjected to the formation of the transparent toner image, subjected to the fixation two times.

That is, also in this Comparative Embodiment 1, it is possible to obtain an effect similar to that in the present invention.

Comparative Embodiment 2

20%-Color Image Density

In Comparative Embodiment 2, the color image is formed of the yellow toner with uniform 20%-density in the image formable area. Specifically, the image forming apparatus forms the yellow toner image on the entire surface of the sheet with 20%-density under the above-described image forming condition. That is, the image forming apparatus transfers the yellow toner image onto the sheet at the secondary transfer portion and then fixes the transferred yellow toner on the sheet by the fixing device.

Then, the image forming apparatus conveys the sheet, on which the yellow toner image has been fixed at the entire surface of the sheet, again to the secondary transfer portion. The image forming apparatus forms the transparent toner image on the sheet, which has been conveyed to the secondary transfer portion, at the marked portion (★★ portion) designated by the file "ccc.tif".

The glossiness of the output sheet at the marked portion (M.P.) and the glossiness of the output sheet at the background portion (B.P.) in the case where the transparent toner image and the color toner image are separately formed were as shown in Table 5 below.

TABLE 5

|  | Invention | | C.E. 2 *1 | |
| --- | --- | --- | --- | --- |
|  | M.P. | B.B. | M.P. | B.P. |
| I.D. (T.A.) (%) *2 | 20 | 120 | 120(100) *3 | 20 |
| 60° C.-glossiness (%) | 8 | 22 | 25 | 13 |

*1: "C.E. 2" represents Comparative Embodiment 2.
*2: "I.D.(T.A.)" represents the image density (toner amount).
*3: "120(100)" means that the color toner image is fixed with 20%-density (first fixation) and the transparent toner image is then fixed with 100%-density (second fixation), so that the color toner image and the transparent toner image are fixed with 120%-density in total.

At the marked portion in Comparative Embodiment 2, the yellow toner image is formed with 20%-density and the transparent toner image is formed with 100%-density. Further, at the background portion in Comparative Embodiment 1, the yellow toner image is formed with 20%-density. That is, the image is formed with 120%-toner amount at the marked portion and is formed with 20%-toner amount at the background portion.

As a result, the glossiness at the marked portion (★★ portion) on the matt coated paper as the low glossy paper is 25% and the glossiness at the background portion on the matt coated paper is 13%.

Therefore, the glossiness at the marked portion (★★ portion) at which the transparent toner image is formed after the color toner image is fixed is relatively higher than the glossiness at the background portion. This is because the toner amount at the background portion, which has not been subjected to the formation of the transparent toner image, is small and therefore, different from the case of Comparative Embodiment 1, the glossiness is not increased even in the case where the sheet is subjected to the fixation two times.

That is, when the color image has the 20%-density, by using the comparative method, it was unable to realize the glossiness at the marked portion relatively lower than the glossiness at the background portion.

(Comparison Between Method in Present Invention and Comparative Method)

In the comparative method, after the color toner image is transferred and fixed on the sheet, the transparent toner image is transferred and fixed on the sheet. For that reason, when the image is formed on one surface of the sheet, the image forming apparatus subjects the sheet to the transfer step and the fixation steps each two times.

On the other hand, in the method in the present invention, the color toner image and the transparent toner image are transferred and fixed on the sheet. For that reason, when the image is formed on one surface of the sheet, the image forming apparatus subjects the sheet to the transfer step and the fixation step each one time.

Therefore, in the method in the present invention, the conveyance distance of the sheet can be reduced. Further, the number of times that the sheet is subjected to the transfer step and the fixation step can be decreased. For that reason, when the same process speed is used, productivity of the print (the print number per unit time) in the method in the present invention is higher than that in the comparative method.

Further, in the case where the sheet is the paper, in the comparative method, the color toner image is transferred and fixed. In this case, the sheet is heated by the fixing device, so that water contained in the sheet is evaporated. When the water contained in the sheet is evaporated, the sheet is contracted and a dimension of the sheet is changed. For that reason, when the transparent toner image is transferred onto the sheet on which the color toner image has been fixed, it is difficult to transfer the transparent toner image onto the sheet, which has been contracted by the fixation, with good geometrical accuracy. That is, a degree of deviation between a target position in which the transparent toner image is to be formed and a position in which the transparent toner image is to be actually formed is large.

Further, as described in Comparative Embodiment 1 and Comparative Embodiment 2, depending on the amount of the color toner (the density of the color image) formed on the sheet, the glossiness at the marked portion cannot be lowered even by forming the transparent toner image on the sheet at the marked portion.

That is, the method in the present invention has the advantage that the glossiness at the marked portion irrespective of the density of the color image.

Embodiment 2

Portions or means similar to those in Embodiment 1 are represented by the same reference numerals or symbols, thus being omitted from description. In this embodiment, the image forming system is constituted as shown in FIG. 1(b). Further, the image processing for generating the transparent image data is executed by the MFP controller 200.

Hardware configurations of the PC 300 and the MFP controller 200 which constitutes the image forming system will be described.

The PC 300 constituting the image forming system is an example of an external terminal capable of sending print instructions to the MFP 100. For that purpose, it is also possible to use other terminals capable of sending the print instructions to the MFP 100 as an alternative to the PC. For example, it is possible to use portable information terminals such as a WS (work station) and a PDA (personal digital assistant) as the alternative to the PC.

(Hardware Configuration of PC)

Figure 14:
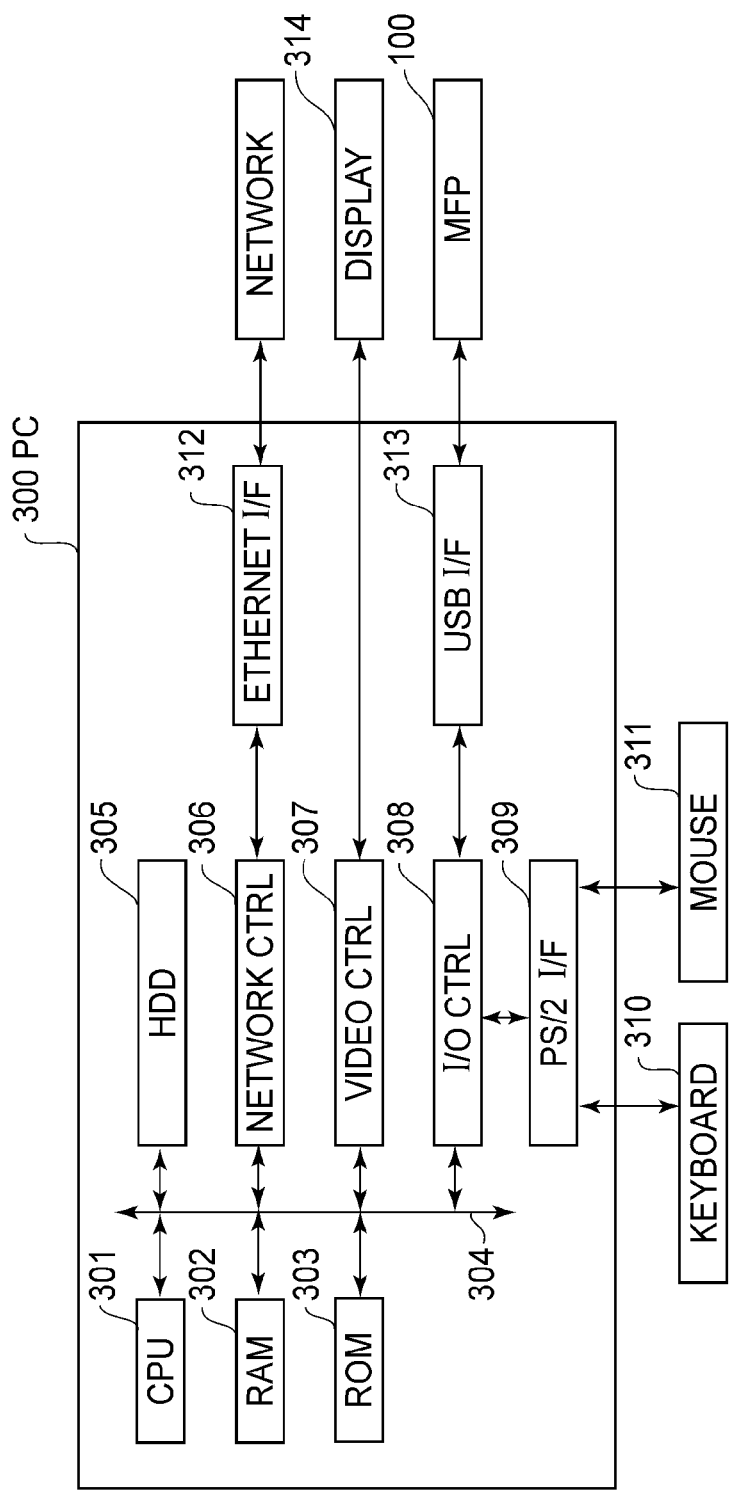
FIG. 14 is a block diagram showing a schematic constitution of a PC (personal computer) in aforementioned another embodiment of the present invention.

FIG. 14 is a block diagram showing the hardware configuration of the PC 300 as an example of the PC. The hardware configuration of the PC 300 will be described.

A CPU 301, an RAM 302, and an ROM 303 are connected to a bus 304. Similarly, a HDD 305, a network controller 306, a video controller 307, and an I/O controller 308 are connected to the bus 304. The various units connected to the bus 304 are communicable with each other through the bus 304. The CPU 301 executes a program, e.g., stored in the ROM 303 by expanding the program in the RAM 302. The ROM 303 stores the program executed by the CPU 301. The RAM 302 is used when the CPU 301 executes the program. Further, the CPU 301 sends control instructions and the like to the HDD 305, the network controller 306, the video controller 307, and the I/O controller 308 through the bus 304. Further, the CPU 301 receives signals for indicating states or data such as image data from the HDD 305, the network controller 306, the video controller 307, and the I/O controller 308 through the bus 304. Thus, the CPU 301 is capable of controlling the various units constituting the PC 300.

The HDD 305 stores various files used in the PC 300. The network controller 306 is a dedicated circuit for communicating with external equipment. The network controller 306 modifies and converts the signals sent from the CPU 301 into multi-valued signals in accordance with the IEEE 803.2 standard and sends the signals to the network through an ethernet I/F 312. Further, the network controller 306 demodulates the multi-valued signals received from the network through the ethernet I/F 312 and sends the demodulated signals to the CPU 301. In this case, a communication path through which the PC 300 communicates with the MFP 100 or the MFP controller 200 is not limited to that in a LAN (local area network) but may also be that through the Internet.

Further, the I/O controller 308 converts the signals sent from the CPU 301 into signals in accordance with standards for the respective interfaces and sends the converted signals to a device connected with an USB I/F 313 or a PS (personal system)/2 I/F 309. Conversely, the I/O controller 308 converts the signals received from the USB I/F 313 or the PS/2 I/F 309 and sends the converted signals to the CPU 301. As a result, the PC 300 and the MFP 100 can communicate with each other through the USB I/F 313. Further, the PC 300 obtains an input signal from a keyboard 310 and a mouse 311 as an input device through the PS/2 I/F 309.

The video controller 307 converts the image data into a signal for a screen displayable at a display 314 in accordance with image display instructions received from the CPU 301. As a result, the CPU 301 can display the screen at the display 314.

In this embodiment, the CPU 301 controls various pieces of hardware constituting the PC in accordance with an OS (operating system). As a result, the user can cause the PC to execute a desired operation by manipulating a GUI (graphical user interface) without concern for the hardware constituting the PC. Further, the user is capable of sending the print instructions from an application program, which is running under the OS, to the external MFP. When the print instructions are sent to the MFP, a control method varies depending on the kind of the MFP. For that reason, the PC produces control instructions depending on the MFP by using a driver program corresponding to the kind of the MFP. The driver program is capable of producing the control instructions depending on the connected peripheral equipment by being incorporated in the OS. The explanation on the example of the hardware configuration of the PC in this embodiment is as described above.

(Hardware Configuration of MFP Controller)

Figure 13:
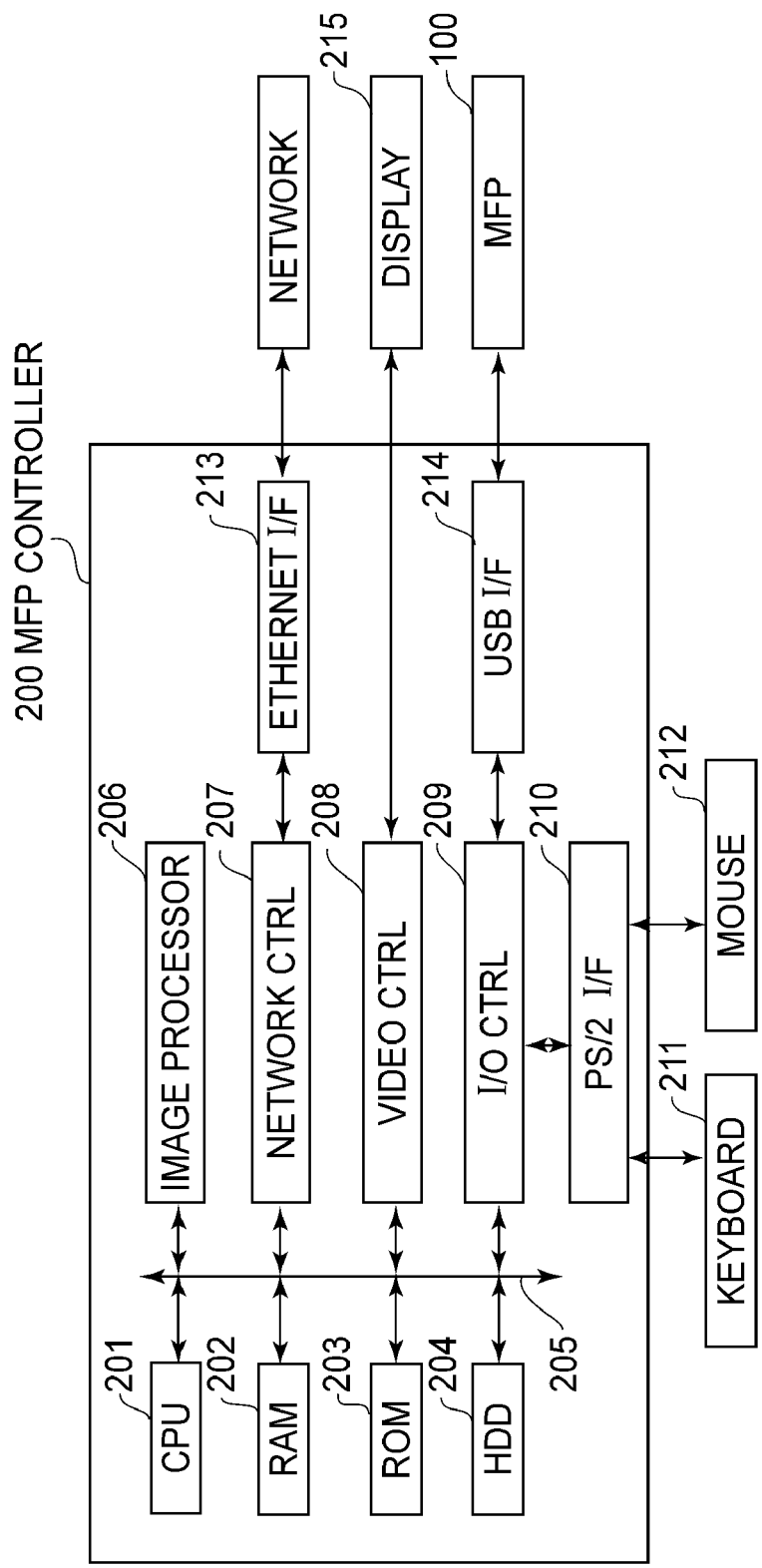
FIG. 13 is a block diagram showing a schematic constitution of an MFP controller in another embodiment of the present invention.

FIG. 13 is a block diagram showing the hardware configuration of the MFP controller 200 capable of converting the PDL into the image data. An example of the hardware configuration of the MFP controller 200 will be described.

The MFP controller 200 constituting the image forming system converts the PDL received from the PC 300 into the image data used for the printing by the MFP 100. The processing for converting the PDL into the image data is referred to as the RIP.

A CPU 201, an RAM 202, and an ROM 203, and a dedicated image processing circuit are connected to a bus 205. Similarly, a HDD 204, a network controller 207, a video controller 208, and an I/O controller 209 are connected to the bus 205. The CPU 201 executes a program, e.g., stored in the ROM 203 by expanding the program in the RAM 202. Further, the CPU 201 sends control instructions and the like to the HDD 204, the network controller 207, the video controller 208, and the I/O controller 209 through the bus 205. Further, the CPU 201 receives signals for indicating states and data such as image data from the HDD 204, the network controller 207, the video controller 208, and the I/O controller 209 through the bus 205. Thus, the CPU 201 is capable of controlling the various units constituting the MFP controller 200.

MFP controller 200 is connected with the PC 300 through an ethernet I/F 213. The MFP controller 200 is connected with the MFP 100 through the ethernet I/F 213. The network controller 207 modifies and converts the signals sent from the CPU 201 into multi-valued signals in accordance with the IEEE 803.2 standard and sends the signals to the network through an ethernet I/F 213. Further, the network controller 207 demodulates the multi-valued signals received from the network through the ethernet I/F 213 and sends the demodulated signals to the CPU 201.

Further, the I/O controller 209 converts the signals sent from the CPU 201 into signals in accordance with standards for the respective interfaces and sends the converted signals to a device connected with an USB I/F 214 or a PS (personal system)/2 I/F 210. Further, the I/O controller 209 converts the signals received from the USB I/F 214 or the PS/2 I/F 210 and sends the converted signals to the CPU 201. As a result, the MFP controller 200 and the MFP 100 can communicate with each other through the USB I/F 214. Further, the MFP controller 200 obtains an input signal from a keyboard 211 and a mouse 212 as an input device through the PS/2 I/F 210.

The video controller 208 converts the image data into a signal for a screen displayable at a display 215 in accordance with image display instructions received from the CPU 201 and sends the converted signal to the display 215. As a result, the CPU 201 can display the screen at the display 215.

The MFP controller 200 receives the PDL sent from the PC 300 and subjects the described PDL to the RIP. Arithmetical operation instructions during the RIP include uniform iteration process. For that reason, in many cases, a shorter execution time is required for processing by a hardware optimized for processing image processing instructions rather than execution of all the arithmetical operation instructions by the CPU 201. For that reason, the MFP controller executes the RIP by sharing the processing between the CPU 201 and the dedicated image processing circuit 206. The RIP may also be performed by the CPU 201 alone. The dedicated image processing circuit 206 is constituted by an ASIC (application specific integrate circuit). The dedicated image processing circuit 206 may also be constituted by mounting a reconfigurable hardware (e.g., a PLD (programmable logic device)). The thus-converted image data by the CPU 201 and the dedicated image processing circuit 206 is sent to the MFP 100.

In this embodiment, preparation of the image data is carried out by the MFP controller 200 but may also be carried out by the MFP 100.

The explanation on the hardware configuration of the MFP controller in this embodiment is as described above.
(MFP Controller Operation Along Flow Chart)

In this embodiment, the image forming system is constituted by the PC 300, the MFP controller 200, and the MFP 100 as shown in FIG. 1(*b*). Incidentally, the MFP 100 in this embodiment includes the glossiness sensor 15. The PC 300, the MFP controller 200, and the MFP 100 operate in accordance with the programs stored in the ROM 303, the ROM 203, and the ROM 103, respectively.

Figure 15:
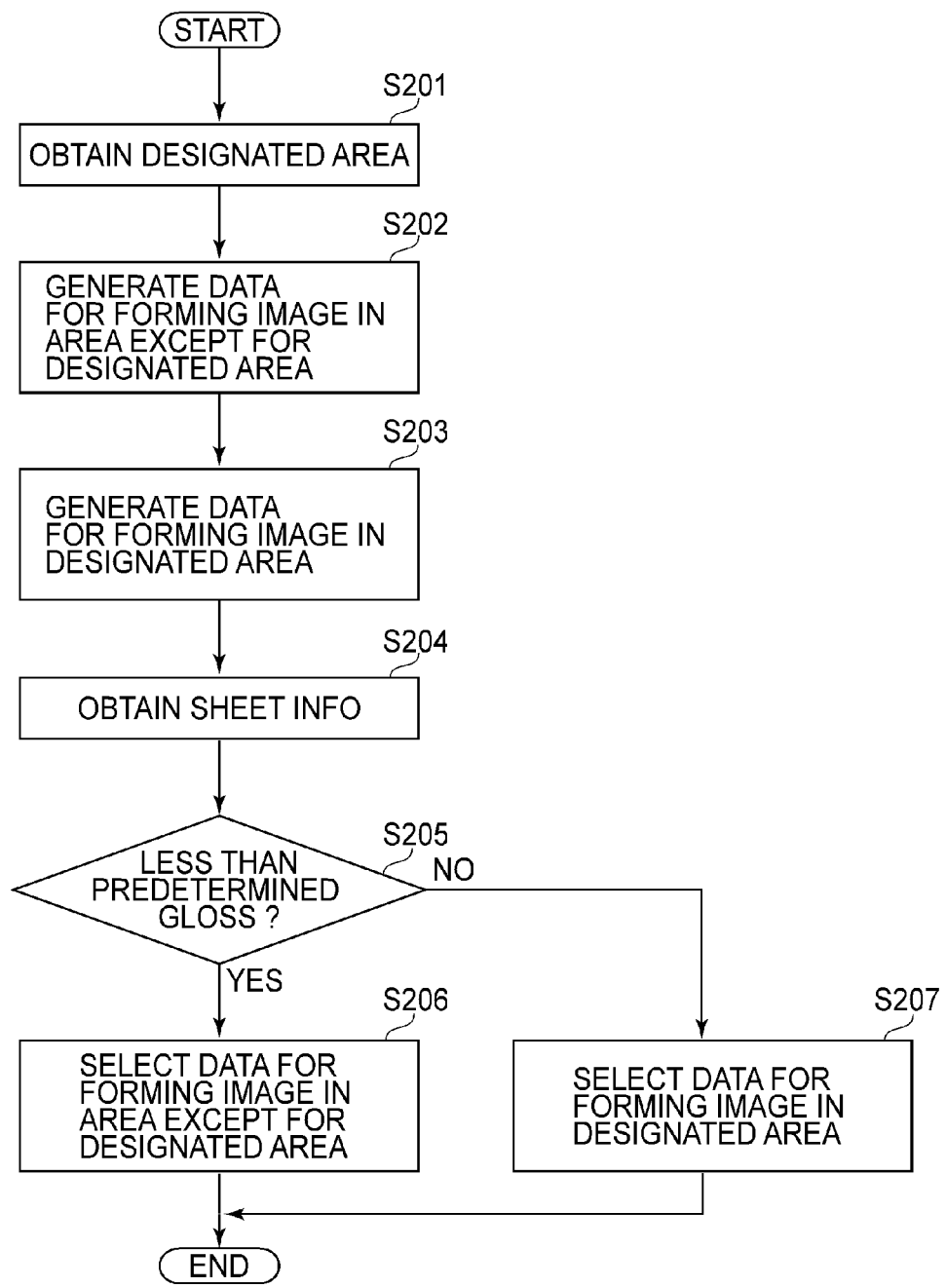
FIG. 15 is a flow chart showing an execution procedure of image processing in aforementioned another embodiment of the present invention.

In this embodiment, the image processing which is a characteristic processing is performed by a CPU 201 of the MFP controller 200. FIG. 15 is a flow chart for illustrating the image processing procedure in this embodiment. Along the flow chart shown in FIG. 15, a flow of execution of the image processing by the CPU 201 will be described.

S201 represents a step for obtaining the area in which the glossiness is intended to be partly and relatively lowered. The CPU 201 as the area obtaining means obtains information indicating the area, in which the user wishes to partly and relatively lower the glossiness, designated by the user.

S202 represents a step for generating the transparent image data corresponding to the area obtained by the CPU 201. The CPU 201 as the image data generating means generates the transparent image data for forming the transparent image in the image formable area except for the area corresponding to the area, in which the glossiness is intended to be partly and relatively lowered, obtained in the step S201.

S203 represents a step for generating the transparent image data for forming the transparent image on the sheet at the printer portion. The CPU 201 as the image data generating means generates the transparent image data for forming the transparent image in the area corresponding to the area obtained in the step S201.

S204 represents a step for obtaining information corresponding to the sheet glossiness (the highly glossy paper or the low glossy paper). The CPU 201 as the sheet information obtaining means obtains the information corresponding to the glossiness of the sheet on which the transparent image is to be formed at the printer portion.

S205 represents a step for selecting the image data to be sent to the printer portion in order to form the transparent image on the sheet on the basis of the information, corresponding to the glossiness of the sheet on which the transparent image is to be formed, obtained in the step S204. In the case where the information, corresponding to the sheet glossiness, obtained in the step S204 indicates the low glossy paper, the CPU 201 executes the processing in a step S206. Further, the information, corresponding to the sheet glossiness, obtained in the step S204 indicates the highly glossy paper, the CPU 201 executes the processing in a step S207.

The step S206 represents a step for determining the transparent image data, to be sent to the printer portion, selected in the step S205. The CPU 201 as a transmit data selecting means selects the transparent image data, generated in the step S202, as the transparent image data to be sent to the printer portion. As a result, even in the case where the sheet is the low glossy paper, it is possible to output the sheet with low glossiness in the area designated by the user.

The step S207 represents a step for determining the transparent image data, to be sent to the printer portion, selected in the step S205. The CPU 201 selects the transparent image data, generated in the step S203, as the transparent image data to be sent to the printer portion. As a result, even in the case where the sheet is the highly glossy paper, it is possible to output the sheet with low glossiness in the area designated by the user.

Thus, even when the order of the image processing described in Embodiment 1 is changed, the glossiness in the area designated by the user can be relatively lowered. In this embodiment, the steps from S201 to S207 are performed by the MFP controller 200. However, the steps from S201 to S207 may also be performed by different CPUs inside a plurality of devices constituting the image forming system. That is, e.g., the processing in the step S201 may be performed by the CPU 201 inside the MFP controller 200 and the processing in the step S202 may be performed by the CPU 101 inside the MFP 100.

As described above, in the execution procedure shown in FIG. 15, the CPU 201 generates two patterns of the transparent image data before it obtains the information corresponding to the sheet glossiness. After the two patterns of the transparent image data are generated, the CPU 201 selects the transparent image data to be sent to the printer portion on the basis of the glossiness obtained by the glossiness sensor 15 of the MFP 100. The glossiness sensor 15 is disposed in the neighborhood of the registration roller pair 8 as shown in FIG. 3. For that reason, the sheet glossiness cannot be measured until the sheet is conveyed to the neighborhood of the registration roller pair 8. For that reason, as described along the flow chart of FIG. 15, it is possible to reduce a time required to complete the formation of the transparent image on the sheet by preparing the two patterns of the transparent image data (image data) in advance.

Incidentally, the MFP controller may also send both of the generated two patterns of the transparent image data to the MFP 100. In this case, however, data communication traffic is increased since both of the two patterns of the transparent image data having been subjected to the RIP are sent to the MFP 100.

The above is the description as to the image processing which is the characteristic processing in the MFP controller 200.

(Specific Example of Operation for Forming Transparent Image Data)

In this embodiment, the sheet glossiness is obtained by the glossiness sensor 15 of the MFP 100. The obtained glossiness is sent from the MFP 100 to the MFP controller 200. Further, the image data (the PDL in this embodiment) indicating the area in which the user wishes to relatively lower the glossiness is sent from the PC 300 to the MFP controller 200. Incidentally, the image data indicating the area in which the user wishes to relatively lower the glossiness may only be required to be designated by the PC 300 and is not required to be stored in the HDD 305 inside the PC 300. An example for designating the image data indicating the area in which the user wishes to relatively lower the glossiness will be described below.

Figure 16:
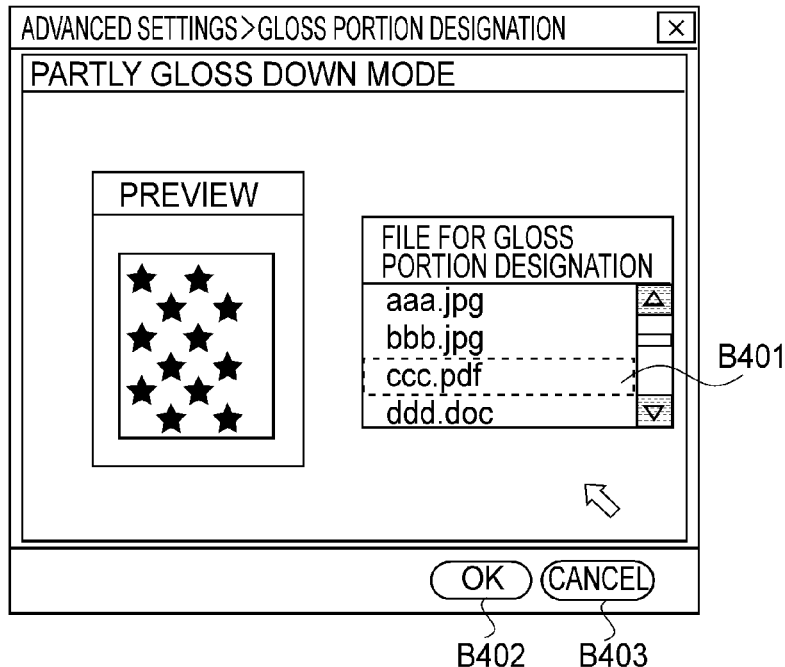
FIG. 16 is a schematic view showing an example of a screen displayed on a display of the PC in aforementioned another embodiment of the present invention.

(Explanation for Screen Shown in FIG. 16)

FIG. 16 is a schematic view showing the example of the screen for urging the user to input the "information area in which glossiness is intended to be partly lowered". As shown in FIG. 16, files stored in an HDD 304 inside the PC 300 are displayed at a display 314 in a selectable manner in list form. As a result, the user can designate (select) the file, indicating the area in which the glossiness is relatively lowered, from the files stored in the HDD 304 by using a mouse 311 or the like. In FIG. 16, "ccc.pdf" (B401) is selected as a file indicating the area in which the user wishes to relatively lower the glossiness. Further, the user can designate a file other than the file stored in the HDD 304. Incidentally, the method of designating the area in which the user wishes to relatively lower the glossiness is not limited to the designation of the file.

In the case where the user wishes to reflect the above-described settings, the user can select a button B402 (OK button). The thus-set information by the user is stored in an RAM 302 and is sent to the MFP controller 200. Further, in the case where the user do not wish to reflect the settings, the user can select a button B403 (cancel button). As a result, the user can designate the area, in which the user wishes to relatively lower the glossiness, by using the PC 300.

(Operation of Image Forming System on the Basis of Transparent Print Setting Information)

The operation of the image forming system will be described below. As described above, of the transparent print setting information, the "area in which user wishes to relatively lower glossiness" is designated by the PC 300. Further, the "information corresponding to sheet glossiness" is designated by the glossiness sensor 15 of the MFP 100.

The user causes the PC 300 to send a print instruction to the MFP controller 200. The print instruction sent by the PC 300 includes pieces of information on the color image data described in the PDL, the image data for the transparent image (transparent image data) described in the PDL, and a position in which the sheet used for printing is set. In this embodiment, the color image data is configured to provide 50%-density of yellow alone after the color image processing. The transparent image data (PDL) is prepared by converting the file "ccc.pdf" into the PDL. Further, the information on the position in which the sheet used for printing is set is the "CASSETTE 2".

The MFP controller 200 receives the print instruction (S201). Thus, the CPU 201 receives the file "ccc.pdf" corresponding to the "information area in which user wishes to partly lower glossiness".

The CPU 201 and the dedicated image processing circuit 206 subject the received color image data to the RIP. Incidentally, the CPU 201 and the dedicated image processing circuit 206 convert RGB image data into YMCK image data during the RIP of the color image data.

In this embodiment, the sheet glossiness is obtained by the glossiness sensor 15. For that reason, the glossiness sensor 15 does not complete the measurement of the glossiness of the sheet used for printing at the time when the MFP controller 200 receives the print instruction. That is, the glossiness sensor 15 cannot measure the sheet glossiness until the sheet set in the "CASSETTE 2" is conveyed to the neighborhood of the registration roller pair 8. Here, the MFP controller 200 provides a sheet conveyance instruction to the MFP 100 in accordance with the print instruction. During the conveyance of the sheet used for printing by the MFP 100 to the position in which the glossiness sensor 15 can measure the sheet glossiness, the MFP controller 200 generates the two patterns of the transparent image data.

The CPU 201 generates the transparent image data (image data) for selectively form the transparent toner image in the image formable area except for the area designated by the transparent image data (PDL form) obtained in the step S201 (S202). Further, the CPU 201 generates the transparent image data (image data) for selectively form the transparent toner image in the area designated by the transparent image data (PDL form) obtained in the step S201 (S203).

The CPU 201 starts the image processing until the sheet glossiness is measured by the glossiness sensor 15. As a result, the transparent image data can be generated earlier than the RIP performed after the sheet glossiness is measured. The CPU 201 may also execute the processing in the step 202 and the processing in the step S203 in parallel. Further, the CPU 201 may also interrupt the generation of either one of the transparent image data which is unnecessary at the time when the CPU 201 receives the sheet glossiness (information) from the glossiness sensor 15.

The CPU 201 obtains the glossiness, of the sheet used for printing, measured by the glossiness sensor 15 (S204).

The CPU 201 selects the transparent image data generated in the step S203 or S204 on the basis of the obtained sheet glossiness (S205, S206 and S207).

Here, when the sheet glossiness is "60%", the CPU 201 sends the transparent image data and the color image data, which are generated in the step S202, to the printer portion 115. Further, when the sheet glossiness is "50%", the CPU 201 sends the transparent image data and the color image data, which are generated in the step S203, to the printer portion 115.

The printer portion 115 forms the image on the sheet in accordance with the received transparent image data and color image data.

As described above, by employing the constitution in this embodiment, even in the case where the sheet glossiness is low, it is possible to relatively lower the glossiness in the area designated by the user. Further, irrespective of the glossiness of the sheet on which the transparent toner image is to be formed, the glossiness in the area in which the user wishes to lower the glossiness can be lowered. In this embodiment, the glossiness is obtained by the glossiness sensor, so that there is no need for the user to manually set the information on the sheet glossiness.

Incidentally, the explanation for the print output by the MFP 100 will be omitted.

Embodiment 3

With respect to portions or means similar to those in the above-described embodiments, the portion or means are represented by the same reference numerals or symbols, thus being omitted from description.

(Role of Glossiness Sensor in this Embodiment)

In this embodiment, the image processing for generating the transparent image data is executed by the PC 300. Further, in this embodiment, the glossiness sensor 15 is disposed at positions B, C and D in the MFP 100 shown in FIG. 3.

The glossiness sensor 15 as the glossiness detecting means can measure the glossiness of the sheet surface. However, the type of the sheet cannot be discriminated by the glossiness sensor 15. That is, the glossiness sensor 15 can measure the sheet glossiness as being "5%" but cannot discriminate the type of the sheet. For example, the glossiness sensor 15 cannot discriminate whether the paper (sheet) with the glossiness of "5%" is "sheet with 5%-glossiness mfd. by A CO." or "sheet with 5%-glossiness mfd. by B CO." Here, the "sheet with 5%-glossiness mfd. by A CO." has "basis weight: 40 $g/m^2$" and the "sheet with 5%-glossiness mfd. by B CO." has "basis weight: 200 $g/m^2$". In order to realize desired glossiness, the MFP 100 changes the process speed and the fixing condition such as the fixing temperature depending on the basis weight of the sheet. Therefore, during adjustment of the glossiness, desirably, there is the need to know the type of the sheet.

For that reason, in this embodiment, in the case where the glossiness depending on the sheet type set by the user and the glossiness of the sheet measured by the glossiness sensor 15 provide a difference which is a measurement error (±2% in this embodiment) or more, the PC 300 urges the user to set the sheet type again. By constituting the image processing system as described above, it is possible to prevent erroneous setting of the sheet type by the user. In this embodiment, the MFP 100 is operable in a mode in which a glossiness difference between an area in which the glossiness is to be lowered and an area in which the glossiness is to be increased is increased and a mode in which the glossiness difference is decreased. Hereinafter, the mode in which the glossiness difference is increased is referred to as a "STRONG GLOSS DOWN MODE" and the mode in which the glossiness difference is decreased is referred to as a "WEAK GLOSS DOWN MODE". The PC 300 displays "STRONG GLOSS DOWN MODE" and "WEAK GLOSS DOWN MODE" at the display in a selectable manner. The user selects a desired mode, from modes displayed on a screen (not shown) at the display, with the mouse. The glossiness of the sheet after the toner is fixed is largely affected by the fixing condition and the sheet type. For that reason, in order to finely adjust the glossiness of the sheet after the toner is fixed, the MFP 100 or the PC 300 may desirably holds the LUT as shown in FIG. 5 in the RAM or the like for each sheet.

Thus, by disposing the glossiness sensor at the positions B, C and D, the image forming system can accurately know the type of the sheet.

(Operation of PC Along Flow Chart)

Figure 18:
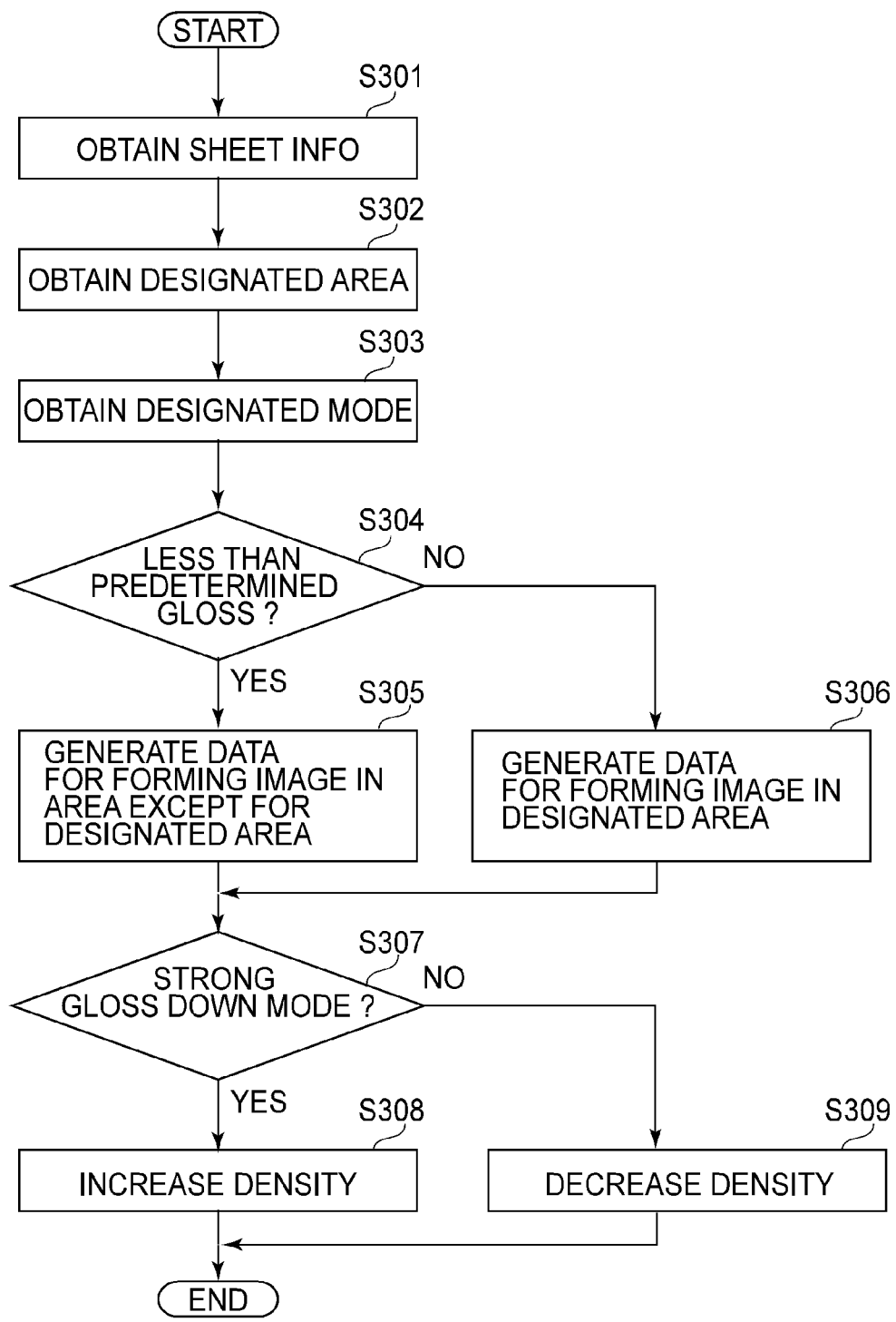
FIG. 18 is a flow chart showing an execution procedure of image processing in the further embodiment of the present invention.

In this embodiment, such a constitution that the image forming system is constituted by the PC 300 and the MFP 100 as shown in FIG. 1(c) is assumed. The PC 300 and the MFP 100 operate in accordance with the programs stored in the ROM 303 and the ROM 103, respectively. In this embodiment, the CPU 301 of the PC 300 executes the image processing along the flow chart of FIG. 18. An image processing operation performed by the PC 300 as the information processing apparatus in accordance with a program stored in the ROM 303 will be described below. Here, the description will be made with a view to explain how the information processing apparatus operates in accordance with the program, so that a detailed image forming operation of the entire image forming system will be described later.

S301 represents a step for obtaining information on the sheet. The CPU 301 as the sheet information obtaining means obtains information on the sheet on which the image is to be formed. Here, the information on the sheet refers to the type of the sheet. Incidentally, the obtained type of the sheet (e.g., "B CO. M.C.P.") is the above-described information such that the designation error by the user is reduced by using the glossiness sensor. The CPU 301 makes reference to various pieces of information (the glossiness, the high glossy paper or the low glossy paper, the basis weight, and the like) on the basis of the sheet type (e.g., "B CO. M.C.P.").

S302 represents a step for obtaining information indicating an area, in which the glossiness is intended to be lowered, designated by the user. The CPU 301 as the area information obtaining means obtains the information indicating the area, in which the glossiness is intended to be lowered, designated by the user.

S303 represents a step for obtaining a mode designated by the user. The CPU 301 as the mode obtaining means obtains the mode ("STRONG GLOSS DOWN MODE" or "WEAK GLOSS DOWN MODE") selected (designated) by the user.

S304 represents a step for determining the transparent image data to be generated on the basis of the information, of the various pieces of information obtained in the step S301, as to whether the sheet is the highly glossy paper or low glossy paper. The CPU 301 executes processing in a step S305 when the sheet is the highly glossy paper. Further, CPU 301 executes processing in a step S306 when the sheet is the highly glossy paper.

In the step S305, the CPU 301 as the image data generating means generates the transparent image data used for forming the transparent image at the printer portion in the image formable area except for the area obtained in the step S302 in the case where the sheet used for printing is the low glossy paper in the step S304. The transparent image data generated in this step is sent to the printer portion, so that the sheet on which the transparent toner is added (placed) in the area except for the area obtained in the step S302 is output.

In the step S306, the CPU 301 as the image data generating means generates the transparent image data used for forming the transparent image at the printer portion in the image formable area of the area obtained in the step S302 in the case where the sheet used for printing is the highly glossy paper in the step S304. The transparent image data generated in this step is sent to the printer portion, so that the sheet on which the transparent toner is added (placed) in the image formable area of the area obtained in the step S302 is output.

S307 represents a step for determining a gain of the density of the transparent image data generated in the step S305 or S306 on the basis of the mode designated by the user in the step S303. Here, the gain refers to a proportionality coefficient by which is a signal value of the transparent image data generated in, e.g., the step S305 is to be multiplied. When the mode obtained by the CPU 301 in the step S303 is the "STRONG GLOSS DOWN MODE", the CPU 301 executes processing in a step S308. When the mode obtained by the CPU 301 in the step S303 in the "WEAK GLOSS DOWN MODE", the CPU 301 executes processing in a step S309.

In the step S308, the transparent image data to be sent to the printer portion is converted. The CPU 301 multiplies the signal value of the transparent image data generated in the step S305 or S306 by the gain (value for increasing the signal value). The thus-generated new transparent image data is referred to as transparent image data for the "STRONG GLOSS DOWN MODE". Here, the gain is a predetermined value (e.g., 1.5). The gain may also be calculated from the LUT by the CPU 301.

In the step S309, the transparent image data to be sent to the printer portion is converted. The CPU 301 multiplies the signal value of the transparent image data generated in the step S305 or S306 by the gain (value for decreasing the signal value). The thus-generated new transparent image data is referred to as transparent image data for the "WEAK GLOSS DOWN MODE". Here, the gain is a predetermined value (e.g., 0.5). The gain may also be calculated from the LUT by the CPU 301.

The CPU 301 sends the generated transparent image data for the "STRONG GLOSS DOWN MODE" or the generated transparent image data for the "WEAK GLOSS DOWN MODE" to the printer portion.

Incidentally, the respective steps from S301 to S309 may also be performed in a distributed manner by the CPU and the dedicated image processing circuit which are provided inside the plurality of devices constituting the image forming system. For example, the obtaining of the sheet glossiness performed in the step S301 may be executed by the CPU 101 of the MFP 100 and the obtaining of the area in which the glossiness is intended to be relatively increased, performed in the step S302 may be executed by the CPU 301 of the PC 300.

Incidentally, as described above, in the case where the processes in the respective steps are executed by different devices, the CPU 101 of the MFP 100 operates in accordance with a host program and the CPU 301 of the PC 300 operates in accordance with a client program. By these programs, the information processing system consisting of the plurality of the information processing apparatuses can execute the image processing in a cooperation manner.

(Specific Example of Operation for Generating Transparent Image Data)

The image processing for generating the transparent image data by the PC 300 will be described below.

(Mechanism for Reducing Sheet Setting Error)

The MFP 100 is provided with the glossiness sensors 15 at the positions B, C and D. The glossiness sensors 15 disposed at the positions C and B measure the glossiness of the sheet set in "CASSETTE 1" and "CASSETTE 2", respectively. Further, the glossiness sensor 15 disposed at the position D measures the glossiness of the sheet set in "MANUAL FEEDING TRAY". Further, the MFP 100 can set information corresponding to the type of the sheet set in each of "CASSETTE 1", "CASSETTE 2", and "MANUAL FEEDING TRAY".

For example, when the user sets the sheet "B CO. M.C.P. B.W. 157 g/m$^2$" in the "CASSETTE 2" after the sheet "A CO. G.C.P. B.W. 157 g/m$^2$" is set in the "CASSETTE 2", the MFP erroneously recognizes the sheet "B CO. M.C.P. B.W. 157 g/m$^2$" as the sheet "A CO. G.C.P. B.W. 157 g/m$^2$" if the user does not updates the information corresponding to the type of the sheet se tin the "CASSETTE 2".

Here, the MPF 100 compares the glossiness (6%) of the sheet set in the "CASSETTE 2" obtained by using the glossiness sensor located at the position C (FIG. 3). With the glossiness (50%) of the sheet "A CO. G.C.P. B.W. 157 g/m$^2$" registered in the MFP 100. In the case where a resultant glossiness difference is out of the measurement error range (±2%) of the glossiness sensor, the MFP 100 displays at the display the screen for urging the user to set the sheet type in the "CASSETTE 2" again. By employing the above-described constitution, the MFP 100 can know the type of the sheet with accuracy. Incidentally, in this embodiment, the information on the sheet set in the MFP 100 can also be changed in the PC 300 similarly as in the case of the MFP 100.

The screen displayed at the display of the PC 300 will be described below.

Figure 17:
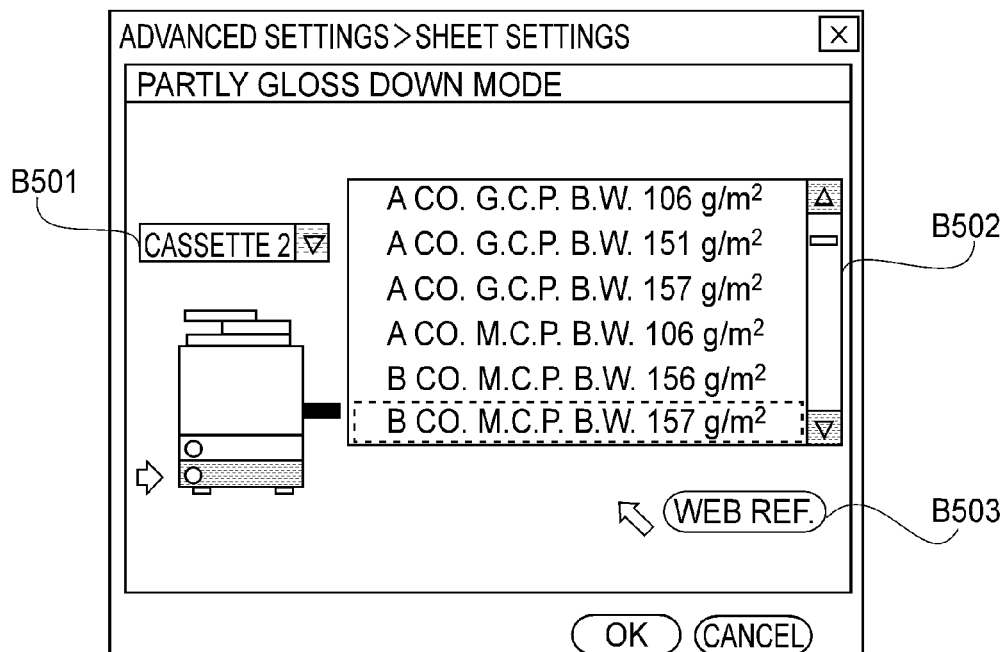
FIG. 17 is a schematic view showing an example of a screen displayed on a display of the PC in a further embodiment of the present invention.

(Explanation for Screen Shown in FIG. 17)

FIG. 17 is a schematic view showing the screen displayed at the display of the PC 300. The user can change the information on the sheet used for printing by using the mouse 311 or the like of the PC 300. The user can select the cassette 13$a$, the cassette 13$b$, and the manual feeding tray 14, each in which the sheets used for printing are set, as shown in FIG. 3. When the user selects B501, the "CASSETTE 1", the "CASSETTE 2", and the "MANUAL FEEDING TRAY" are selectably presented on the display 314 in the form of a pull-down menu. As shown in FIG. 17, when the user selects the "CASSETTE 2", on the display 314, the type of sheets selectable by the user is presented in list form. In this embodiment, the paper ("Golden Cask Super Art"; basis weight=157 g/m$^2$) has been set in the "CASSETTE 1" and the paper ("U-light"; basis weight=157 g/m$^2$) has been set in the "CASSETTE 2". For that reason, when the "CASSETTE 2" is selected from the pull-down menu presented in the selectable manner, the CPU 301 controls a cursor B502 so as to be positioned at "B CO. M.C.P. B.W. 157 g/m$^2$" corresponding to the paper "U-light" (basis weight=157 g/m$^2$). Further, in the case where the "CASSETTE 1" is selected from the selectably presented pull-down menu, the CPU 301 controls the cursor B502 so as to be positioned at "A CO. G.C.P. B.W. 157 g/m$^2$" corresponding to the paper "Golden Cask Super Art" (basis weight=157 g/m$^2$).

Here, when the user selects the "CASSETTE 2" from the pull-down menu and selects the "A CO. G.C.P. B.W. 157 g/m$^2$" with the mouse, the PC 300 performs the following operation in the case where the glossiness obtained by the glossiness sensor provided at the position C of the MFP 100 and the glossiness of the paper "A CO. G.C.P. B.W. 157 g/m$^2$" and different from each other. The PC 300 displays at the display 314 the screen (not shown) for urging the user to set the type of the sheet in the "CASSETTE 2" again. It is also possible to cause the display 111 of the MFP 100 to display the screen (not shown) for urging the user to set the type of the sheet again. Incidentally, in the case where the sheet type is not displayed in the list, the user can select a button B503. When the button B503 is selected, the PC 300 may be connected with a server through the network, thus designating another type of the sheet.

In the case where the user wishes to reflect the above-described settings, the user can select a button B504 (OK button). Further, in the case where the user do not wish to reflect the settings, the user can select a button B505 (cancel button). As a result, the user can change the information on the sheet used for printing by using the PC 300.

(Operation of Image Forming System on the Basis of Transparent Print Setting Information)

The operation of the image forming system will be described below. As described above, of the transparent print setting information, the "area in which user wishes to relatively lower glossiness" is designated, by the file "ccc.pdf" similarly as in Embodiment 2, by the PC 300. Further, the "information corresponding to sheet glossiness" is designated by PC 300 ("B CO. M.C.P. B.W. 157 g/m$^2$" in "CASSETTE 2"). Further, under such a condition that the user selects the "STRONG GLOSS DOWN MODE", an example in which the CPU 301 operates along the flow chart of FIG. 6 will be described below.

In the step S301 and S302, the CPU 301 obtains the transparent print setting information. Further, in the step S303, the CPU 301 obtains the mode designated by the user.

In the step S304, the CPU 301 judges whether the sheet used for printing is the highly glossy paper or the low glossy paper on the basis of the sheet type stored in the RAM 302. Here, the sheet used for printing is that set in the "CASSETTE 2" as designated in FIG. 17. The sheet set in the "CASSETTE 2" is the low glossy paper. For that reason, the CPU 301 performs the processing in the step S305.

In the step S305, the CPU 301 generates the transparent image data for selectively forming the transparent toner image in the image formable area except for the area in which the user wishes to relatively lower the glossiness. Incidentally, the thus-generated (prepared) transparent image data is the image data which is a signal for forming the transparent toner image with 100%-density in the image formable area except for the area designated by the file "ccc.pdf".

In the step S307, the processing is changed depending on the mode designated by the user. As described above, the CPU 301 obtains the "STRONG GLOSS DOWN MODE" in the step S303. For that reason, the CPU effects the processing in the step S308.

In the step S308, the CPU 301 changes the transparent image data prepared in the step S305. The CPU 301 changes the density of the signal for forming the transparent toner image, with 100%-density, prepared in the step S305. Here, the user wishes the "STRONG GLOSS DOWN MODE", so that the density signal is changed to that for forming the transparent toner image with 150%-density in order to lower the glossiness difference between the area in which the user wishes to increase the glossiness and the adjacent area thereof. In this step, the transparent image data is converted into data such that the transparent toner image is formed with 150%-density in the image formable area except for the area designated by the file "ccc.pdf". The CPU 301 sends the generated transparent image data to the MFP 100. The MFP sends the received transparent image data to the printer controller 108. The printer controller 108 controls the printer portion 115 on the basis of the received transparent image data to output on the matt coated paper as the output product on which the transparent toner image is formed in the image formable area except for the portion (area) designated by the file.

Incidentally, in the case where the sheet used for printing is the low glossy paper and the mode designated by the user is the "WEAK GLOSS DOWN MODE", the CPU 301 executes the processing in the step S309 instead of that in the step S308. Further, in the case where the sheet used for printing is the highly glossy paper and the mode designated by the user is the "STRONG GLOSS DOWN MODE", the CPU 301 executes the processing in the step S306 instead of that in the step S305. Further, in the case where the sheet used for printing is the highly glossy paper and the mode designated by the user is the "WEAK GLOSS DOWN MODE", the CPU 301 executes the processing in the step S306 instead of that in the step S305 and executes the processing in the step S309 instead of that in the step S308. Incidentally, the gain in the case of the "WEAK GLOSS DOWN MODE" is 0.5. Here, the gain is changed at two levels ("STRONG/WEAK") but may also be changed at multiple levels.

By constituting the image forming system as described above, the user can adjust the difference in glossiness between the designated area and another designated area without depending on the sheet type. A result of measurement of the glossiness at the marked portion (M.P.) and the glossiness at the background portion (B.P.) under various conditions is summarized in Table 6 below.

TABLE 6

| Paper *1 | | Glossiness (%) | | |
| --- | --- | --- | --- | --- |
| type | Mode *2 | M.P. | B.P. | G.D. *3 |
| L.G.P. | S.G.D.M. | 8 | 19 | 11 |
| L.G.P. | W.G.D.M. | 8 | 14 | 6 |
| H.G.P. | S.G.D.M. | 22 | 35 | 13 |
| H.G.P. | W.G.D.M. | 26 | 35 | 9 |

*1: "H.G.P." represents the highly glossy paper and "L.G.P." represents the low glossy paper.
*2: "S.G.D.M." represents the "STRONG GLOSS DOWN MODE" and "W.G.D.M." represents the "WEAK GLOSS DOWN MODE".
*3: "G.D." represents the glossiness difference.

As described above, by employing the constitution in this embodiment, even in the case where the sheet glossiness is low, it is possible to relatively lower the glossiness in the area designated by the user. Further, in this embodiment, the MFP and the PC can urge the user to set again the "type of sheet" set by the user. As a result, it is possible to reduce unintentional output of the output product due to input error by the user.

Various embodiments are specifically described above. Hereinafter, characteristic processing refers to the processing along the flow chart (FIG. 6 or FIG. 15). The characteristic processing is constituted by roughly divided three portions. A first is obtaining of the area in which the glossiness is intended to be relatively lowered, a second is obtaining of the information corresponding to the sheet glossiness, and a third is generation of the transparent image data to be sent to the printer portion. In Embodiment 1, the characteristic processing was performed by the MFP 100. In Embodiment 2, the characteristic processing was performed by the information processing system consisting of the three information processing apparatuses. Specifically, the obtaining of the area in which the glossiness was intended to be relatively lowered was effected by the MFP 100. The PC 300 and the MFP 100 sent the obtained (associated) information to the MFP controller 200. The MFP controller 200 effected the generation of the transparent image data on the basis of the obtained transparent printer setting information.

Thus, the characteristic processing may be executed by the single information processing apparatus or the information processing system including a plurality of information processing apparatuses.

A program for causing the information processing apparatus to execute the transparent image data forming processing of the characteristic processing is stored in the ROM 103 inside the MFP 100 in Embodiment 1. Further, the program for causing the information processing apparatus to execute the transparent image data forming processing is stored in the RAM 203 inside the MFP controller 200 in Embodiment 2. Further, the program for causing the information processing apparatus to execute the transparent image data forming processing is stored in the ROM 303 inside the PC 300 in Embodiment 3.

Further, the program for executing the characteristic processing may also be supplied from a remote device to the information processing system or the information processing apparatus. Further, the information processing apparatus included in the information processing system may read and execute program code stored in an external information processing apparatus.

That is, the program itself to be installed in the information processing apparatus is used for realizing the above-described processing. The form of the program is not limited so long as the information processing apparatus can execute the above-described processing by using the program.

As a recording medium for supplying the program, e.g., it is possible to use a flexible disk, a hard disk, an optical disk, a magneto-optical disk, a CD-ROM (compact-disk read-only memory), a CD-R (compact disk-recordable), a CD-RW (compact disk-rewritable), and the like. Further, as the recording medium, it is also possible to use a magnetic tape, a non-volatile memory card, an ROM, a DVD (digital versatile disk) (DVD-ROM or DVR-R (recordable)), and the like.

Further, in the MFP 100, the program may also be downloaded from the network through the ethernet I/F 114. Further, in the MFP controller 200 and the PC 300, the program may also be downloaded from a homepage (web site) on the Internet by using a browser. That is, from the homepage, the program itself or a program file which is compressed and has an auto-install function is downloaded into the recording medium such as the hard disk. Further, it is also possible to obtain the program by dividing a program constituting the program for executing the above-described processing into a plurality of files and by downloading the divided files from different homepages, respectively. That is, there is a possibility that a WWW (world wide web) server capable of downloading a program file with respect to a plurality of users constitutes a constituent feature.

Further, the program file may also be distributed to the users by being encrypted and then being stored in a storage medium such as the CD-ROM. In this case, it is also possible to permit only a user who fulfils a predetermined requirement (condition) to download key information for decrypting the encrypted program, execute the decryption of the encrypted program with the key information, and install the program into the information processing apparatus.

Incidentally, on the basis of instructions from the program, the OS running on the information processing apparatus may also execute a part or all of actual processing.

Further, the program read from the recording medium may also be written (stored) in a memory provided to a function expanding board inserted into the information processing apparatus or a function extending unit connected to the information processing apparatus. On the basis of the instructions, a CPU provided in the function expanding board or the function extending unit may also execute a part or all of the actual processing.

While the invention has been described with reference to the structures disclosed herein, it is not confined to the details set forth and this application is intended to cover such modifications or changes as may come within the purpose of the improvements or the scope of the following claims.

This application claims priority from Japanese Patent Application No. 020225/2009 filed Jan. 30, 2009, which is hereby incorporated by reference.

What is claimed is:

1. An image processing apparatus for generating image data to be sent to an image forming portion for forming a transparent image, wherein a transparent toner is placed on at least a part of a sheet on which an image is to be formed, said image processing apparatus comprising:
    sheet information obtaining means for obtaining information corresponding to glossiness at a surface of the sheet on which the image is to be formed;
    area information obtaining means for obtaining information indicating an area in which the glossiness is to be lowered partly and relatively with respect to the sheet on which the image is to be formed; and
    image data generating means for generating, when the glossiness at the surface of the sheet is less than predetermined glossiness on the basis of the information obtained by said sheet information obtaining means, the image data to be sent to the image forming portion such that the transparent image is formed in an image formable area except for the area obtained by said area information obtaining means.

2. An apparatus according to claim 1, wherein when the glossiness at the surface of the sheet is the predetermined glossiness or more on the basis of the information obtained by said sheet information obtaining means, said image data generating means generates the image data to be sent to the image forming portion so such that the transparent image is formed in the area obtained by said area information obtaining means.

3. An image processing apparatus for generating image data to be sent to an image forming portion for forming a transparent image, wherein a transparent toner is placed on at least a part of a sheet on which a color image is to be formed, said image processing apparatus comprising:
    sheet information obtaining means for obtaining information corresponding to glossiness at a type of the sheet on which the color image is to be formed;
    area information obtaining means for obtaining information indicating an area in which the glossiness of the color image to be formed on the sheet is to be lowered partly and relatively; and
    image data generating means for generating the image data to be sent to the image forming portion depending on the information obtained by said sheet information obtaining means such that the glossiness in the area obtained by said area information obtaining means is lowered relatively.

4. A non-transitory computer-readable storage medium storing an executable program for causing an information processing apparatus to function as an image processing apparatus according to claim 1.

5. A non-transitory computer-readable storage medium storing an executable program for causing each of a plurality of information processing apparatuses in an information processing system to function as an image processing apparatus according to claim 1.

6. An image forming apparatus for forming a transparent image, wherein a transparent toner is placed on at least a part of a sheet on which an image is to be formed, said image forming apparatus comprising:

sheet information obtaining means for obtaining information corresponding to glossiness at a surface of the sheet on which the image is to be formed;

area information obtaining means for obtaining information indicating an area in which the glossiness is to be lowered partly and relatively with respect to the sheet on which the image is to be formed; and transparent image forming means for forming, when the glossiness at the surface of the sheet is less than a predetermined glossiness on the basis of the information obtained by said sheet information obtaining means, a transparent toner image in an image formable area except for the area obtained by said area information obtaining means.

\* \* \* \* \*